(12) United States Patent
Kuribayashi et al.

(10) Patent No.: US 6,909,728 B1
(45) Date of Patent: Jun. 21, 2005

(54) SYNCHRONOUS COMMUNICATION

(75) Inventors: Hirotaka Kuribayashi, Hamamatsu (JP); Yasushi Ohtani, Hamamatsu (JP); Junichi Fujimori, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/334,142

(22) Filed: Jun. 15, 1999

(30) Foreign Application Priority Data

Jun. 15, 1998 (JP) .................................... HEI 10-167475

(51) Int. Cl.[7] .............................................. H04J 3/06
(52) U.S. Cl. .................................................... 370/518
(58) Field of Search ................................ 370/250–252, 370/350, 395.62, 503–520; 455/502; 375/293, 354–360, 145, 149, 363–365; 709/248; 84/119; 352/63, 119

(56) References Cited

U.S. PATENT DOCUMENTS

| | | | | |
|---|---|---|---|---|
| 4,470,141 A | * | 9/1984 | Takada ........................ | 370/324 |
| 4,696,052 A | * | 9/1987 | Breeden ..................... | 455/503 |
| 5,408,506 A | * | 4/1995 | Mincher et al. ............. | 375/134 |
| 5,473,612 A | * | 12/1995 | Dehner et al. .............. | 370/514 |
| 5,710,773 A | | 1/1998 | Shiga | |
| 5,764,965 A | * | 6/1998 | Poimboeuf et al. ......... | 713/400 |
| 5,794,020 A | * | 8/1998 | Tanaka et al. .............. | 713/401 |
| 5,901,149 A | * | 5/1999 | Itakura et al. .............. | 370/468 |
| 5,907,827 A | * | 5/1999 | Fang et al. .................. | 704/503 |
| 5,982,828 A | | 11/1999 | Fujimori et al. | |
| 5,991,308 A | * | 11/1999 | Futhrmann et al. .... | 370/395.53 |
| 5,995,570 A | * | 11/1999 | Onvural et al. ............. | 375/356 |
| 6,143,973 A | * | 11/2000 | Kikuchi ....................... | 84/645 |
| 6,389,502 B1 | * | 5/2002 | Toguchi ....................... | 710/314 |
| 6,501,413 B2 | * | 12/2002 | Annan et al. ................ | 342/22 |

FOREIGN PATENT DOCUMENTS

| | | |
|---|---|---|
| JP | 07-326127 | 12/1995 |
| JP | 9-298558 | 11/1997 |
| JP | 9-312669 | 12/1997 |

OTHER PUBLICATIONS

Data Sheet, "Sony Preliminary CXD1947Q," IEEE1394 Link Layer/PCI Bridge LSI; Oct. 18, 1996; pp. 1–4.

"Sony Introduces High–Speed Serial Bus IEEE1394 Integrated Circuits," Sony Semiconductor—Press Releases/MPEG–2; Mar. 31, 2004 (1 page).

"Sony Introduces Firewire High–Speed Serial Bus IEEE1394 LSI," Sony Semiconductor—Press Releases/Firewire High–Speed Serial Bus IEEE 1394 LSI; Mar. 31, 2004, pp 1–2.

* cited by examiner

Primary Examiner—Chi Pham
Assistant Examiner—Thai Hoang
(74) Attorney, Agent, or Firm—Morrison & Foerster LLP

(57) ABSTRACT

In a communication system capable of establishing synchronization among a plurality of communication apparatuses, a master node transmits a WC packet including a system time and a sample count to a transmission node and a reception node. The transmission node transmits a data packet to the reception node while establishing synchronization by using the WC packet. The reception node processes the received data packet while establishing synchronization by using the WC packet.

21 Claims, 19 Drawing Sheets

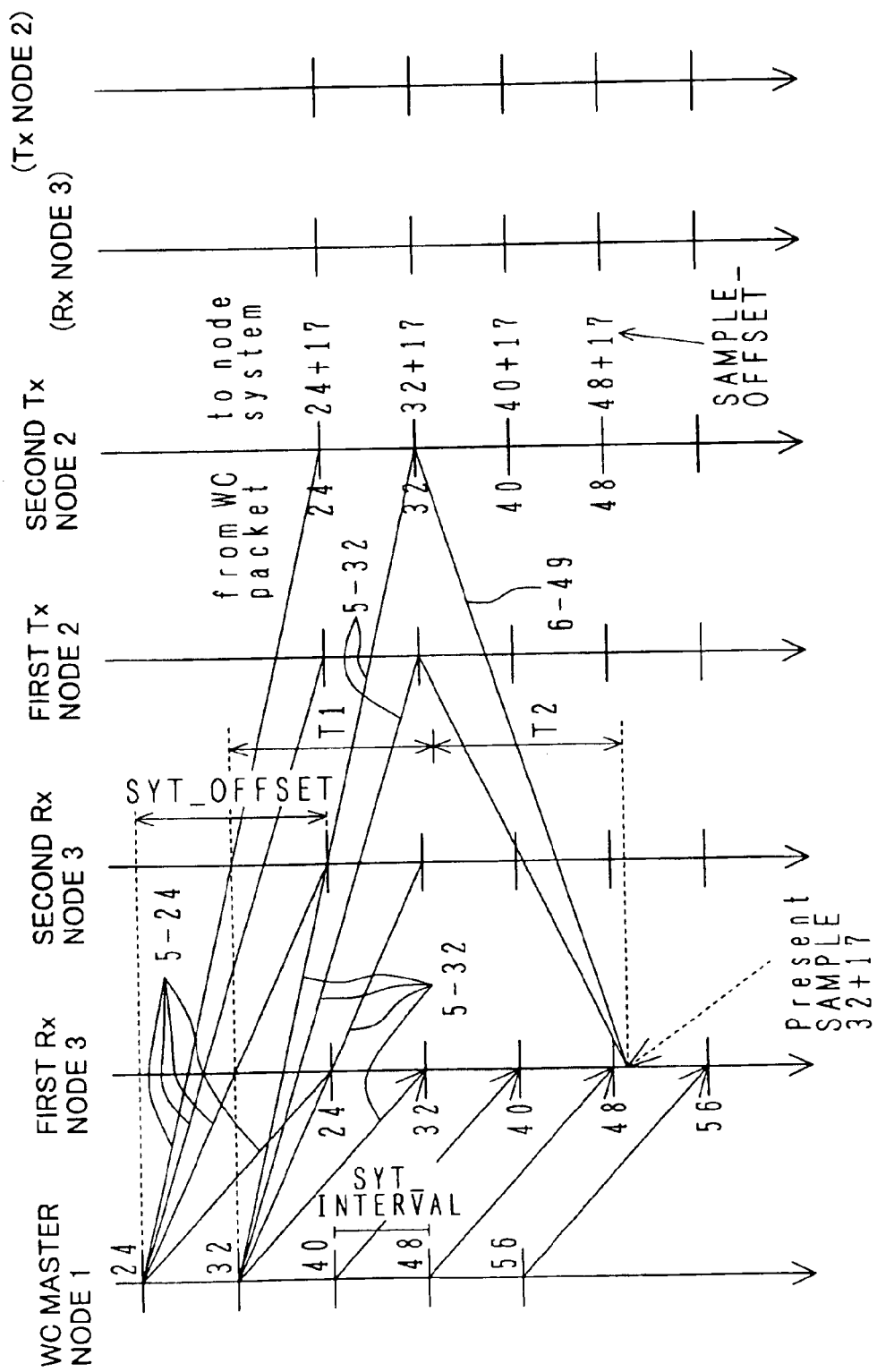

SYNCHRONOUS COMMUNICATION

This application is based on Japanese Patent Application HEI 10-167475, filed on Jun. 15, 1998, the entire contents of which are incorporated herein by reference.

BACKGROUND OF THE INVENTION a) Field of the Invention

The present invention relates to communication techniques, and more particularly to communication techniques for establishing synchronization among a plurality of communication apparatuses.

b) Description of the Related Art

Digital serial communication of IEEE 1394 standards is prevailing. By using IEEE 1394 standards, a network interconnecting a plurality of communication nodes can be configured. For example, one reception node can receive audio data from a plurality of transmission nodes.

Consider the case wherein first and second transmission nodes transmit data to one reception node at the same time. In this case, the time when data from the first transmission node is received at the reception node is often different from the time when data from the second transmission node is received, because of a difference of distance between nodes or because of some other reasons. For example, the reception node receives the data from the first transmission node and thereafter receives the data from the second transmission node.

Transmission and reception nodes have cycle timers specific to them. The cycle timers are not in synchronization with each other. It is difficult for a reception node to synchronize the data from a first transmission node with the data from a second transmission node.

There is another case wherein one transmission node transmits the same data to first and second reception nodes approximately at the same time. However, similar to the above-described case, the time when the first reception node receives the data is often different from the time when the second reception node receives the data. Since the first and second reception nodes reproduce the received data by using their own cycle timers, the reception processes at the first and second reception nodes are likely to have timing shifts. It is difficult for a reception node to synchronize data transmitted from a plurality of transmission nodes. It is also difficult for a transmission node to synchronize data to be transmitted to a plurality of reception nodes.

SUMMARY OF THE INVENTION

It is an object of the present invention to provide a communication apparatus capable of synchronizing data transferred among a plurality of communication nodes.

According to one aspect of the present invention, there is provided a communication apparatus comprising: means for generating first synchronization information; means for generating second synchronization information which reflects a maximum transfer delay amount upon the first synchronization information; and means for transmitting a sample count and the second synchronization information over a network at each of predetermined timings, the sample count corresponding to each of the predetermined timings.

According to another aspect of the present invention, there is provided a communication apparatus comprising: means for receiving first synchronization information supplied externally; means for generating second synchronization information which reflects a maximum transfer delay amount upon the first synchronization information received by the receiving means; and means for transmitting the second synchronization information and corresponding data over a network.

According to another aspect of the present invention, there is provided a communication apparatus comprising first reception means for receiving first synchronization information and corresponding data supplied externally; second reception means for receiving second synchronization information supplied externally; and means for processing the data received by the first reception means, by performing a first synchronization adjustment in accordance with the first synchronization information received by the first reception means and a second synchronization adjustment in accordance with the second synchronization information received by the second reception means.

According to another aspect of the present invention, there is provided a communication apparatus comprising: first means for generating unit for generating first synchronization information; second means for generating second synchronization information in accordance with the first synchronization information, the second synchronization information reflecting a maximum transfer delay amount when the first synchronization information generated by the first means is transferred to another communication apparatus; means for transmitting the second synchronization information generated by the second means over the network; and means for processing data in accordance with the second synchronization information generated by the second means and received without intervening the network.

According to another aspect of the present invention, there is provided a communication apparatus comprising: first reception means for receiving first synchronization information from an external communication means; second reception means for receiving second synchronization information from the external communication means; a measuring unit for measuring a reception delay time of the first synchronization information supplied from the external communication apparatus and received at the first reception means; means for determining a correction value of the first or second synchronization information in accordance with the reception delay time measured with the measuring unit; and means for correcting the first or second synchronization information in accordance with the correction value determined by the determining means, each time the first or second reception means receives the first or second synchronization information.

As above, since synchronization information is transferred among a plurality of communication apparatuses, data can be transmitted or processed while synchronization is established.

BRIEF DESCRIPTION OF THE DRAWINGS

FIGS. 3A and 3B are timing charts illustrating an operation at each node shown in FIG. 1.

DETAILED DESCRIPTION OF THE PREFERRED EMBODIMENTS

Figure 1:
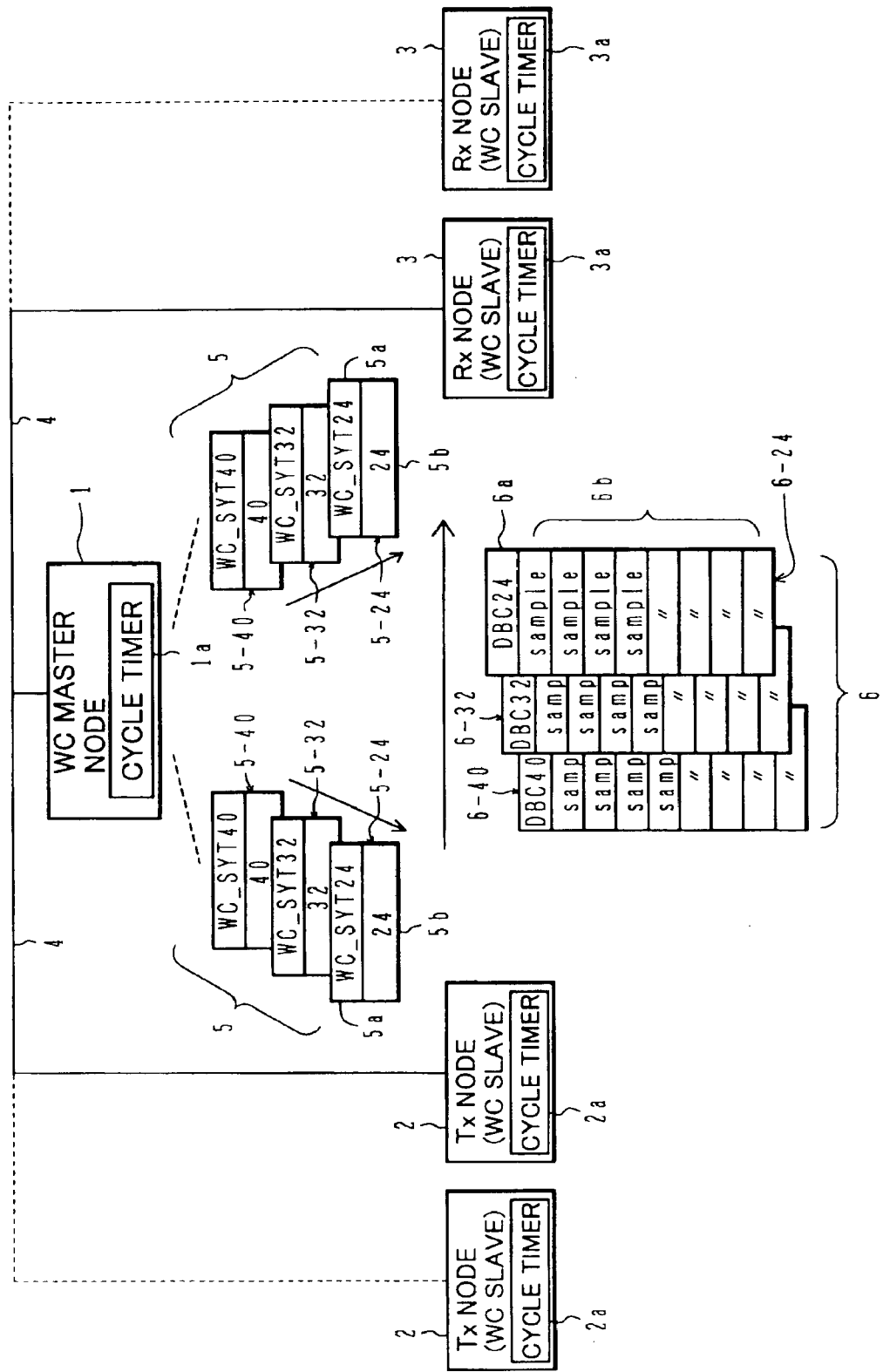
FIG. 1 is a block diagram showing the configuration of a network according to an embodiment of the invention.

FIG. 1 is a block diagram showing the configuration of a communication network according to a first embodiment of the invention.

In this embodiment, packets can be transferred which conform with the rules of "audio and music data transmission protocol" stipulated in IEEE 1394 standards. Packets are preferably transferred in an isochronous transfer mode in conformity with IEEE 1394 standards.

A word clock (WC) master node I and WC slave nodes 2 and 3 are interconnected via an IEEE 1394 bus 4. The WC slave node 2 is a transmission node (hereinafter called a Tx node), and the WC slave node 3 is a reception node (hereinafter called an Rx node). A plurality of Tx nodes and/or a plurality of Rx nodes may be connected to the bus 4.

The WC master node 1, Tx node 2 and Rx node 3 have cycle timers 1a, 2a and 3a, respectively. The cycle timers 1a, 2a and 3a are counters operating typically at a clock of about 25 MHz.

The WC master node 1 transmits a WC packet 5 over the bus 4 to the Tx node 2 and Rx node 3. The WC packet 5 is a packet used for synchronization, and includes a system time 5a and a sample count 5b.

The WC master node 1 sequentially transmits WC packets, e.g., packets 5-24, 5-32, 5-40 ... at a predetermined time interval. The WC packet 5-24 is used for synchronization of audio data of a 24-th sample, and the WC packets 5-32 and 5-40 are used for synchronization of audio data of 32-nd and 40-th samples. The Tx node 2 adjusts the timing in accordance with the WC packet 5 supplied from the WC master node 1, and transmits a data packet 6 to the Rx node 3 via the bus 4. The data packet 6 includes a DBC 6a indicating a sample count and eight sets of sample data 6b.

The Tx node 2 sequentially transmits data packets, e.g., packets 6-24, 6-32, 6-40 ... at a predetermined time interval.

The data packet 6-24 includes audio data 6b of 24-th to 31-st samples, and the data packets 6-32 and 6-40 include audio data of 32-nd to 39-th samples and audio data of 40-th to 47th samples.

The Rx node 3 adjusts the timing in accordance with the WC packet 5 supplied from the WC master node 1, and reproduces sample data (e.g., audio data) in the data packet 6 transmitted from the Tx node 2.

Figure 2:
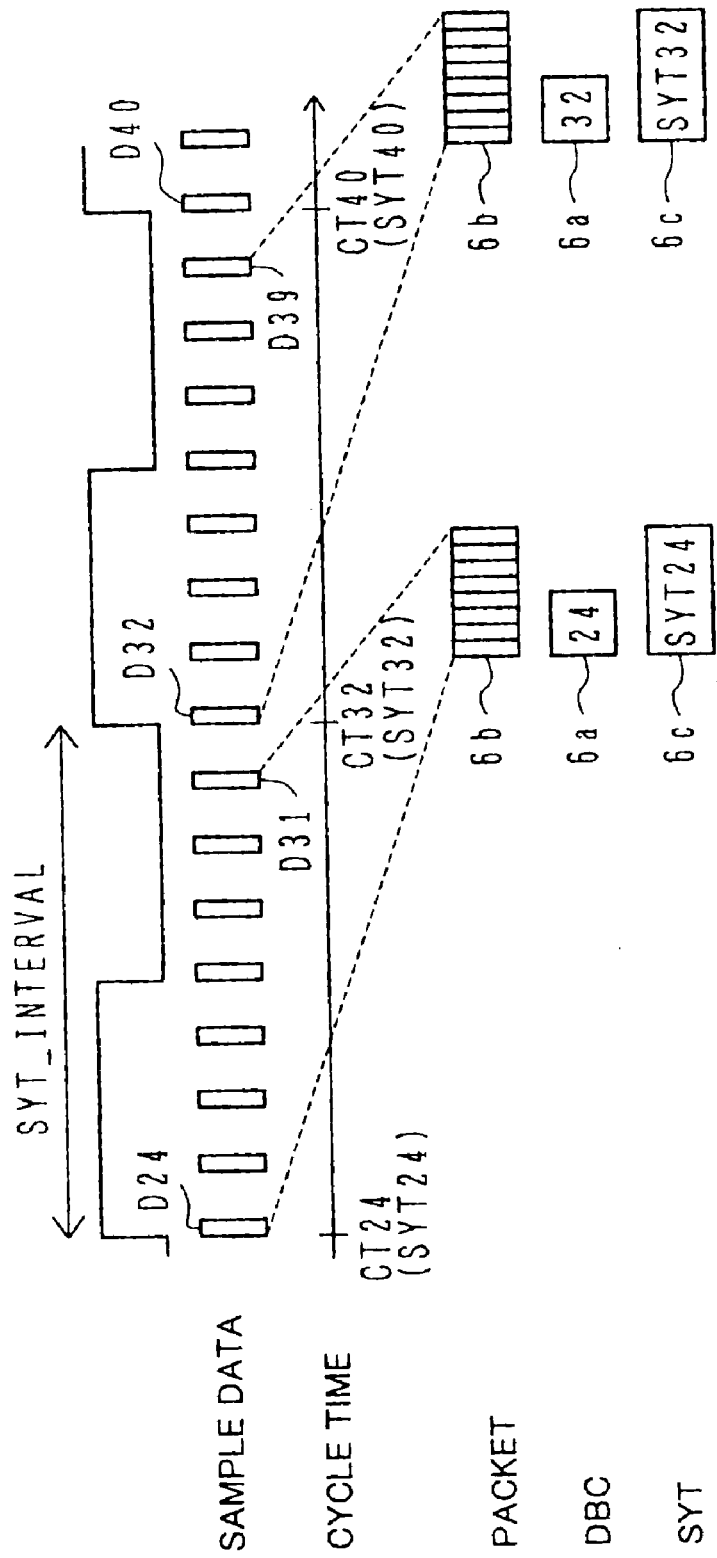
FIG. 2 is a timing chart illustrating a process to be executed at a transmission node (Tx node).

FIG. 2 is a timing chart illustrating the operation of the Tx node 2.

First, a method of generating the data packet 6-24 (FIG. 1) will be described. The Tx node 2 generates one data packet 6b from eight sets of data from the 24-th sample data D 24 to 31-st sample data D 31. An interval SYT_INTERVAL is a period during which a packet is generated.

The cycle timer 2a increments a cycle time value of 32 bits each time a predetermined time lapses. It is assumed herein that the cycle times of the 24-th, 32-nd and 40-th sample data D 24, D 32 and D 40 are CT 24, CT 32 and CT 40, respectively.

System times SYT 24, SYT 32 and SYT 40 correspond to values of the lower 16 bits of the cycle times CT 24, CT 32 and CT 40.

DBC 6a is a sample count. For example, since the top data of the data packet 6b is the 24-th sample data D 24, DBC 6a of the data packet 6b is "24".

The data packet 6 (FIG. 1) includes DBC 6a and the data packet 6b. DBC 6a may be replaced by the system time SYT 24. As described above, the system time SYT 24 corresponds to the timing of the top sample data D 24 of the data packet 6b.

The data packet 6-32 (FIG. 1) can be generated in the manner similar to the above. The Tx node 2 generates one data packet 6b from eight sets of data from the 32-nd sample data D32 to 39-th sample data D39. Since the top data of the data packet 6b is the 32-nd sample data D32, DBC 6a of the data packet 6b is "32". DBC 6a may be replaced by the system time SYT 32.

DBC and system time (SYT) are same as those defined by the rules of "audio and music data transmission protocol" stipulated in IEEE 1394 standards, and are contained in a CIP header of isochronous packet transfer. DBC has 8 bits and SYT has 16 bits.

Figure 3A:
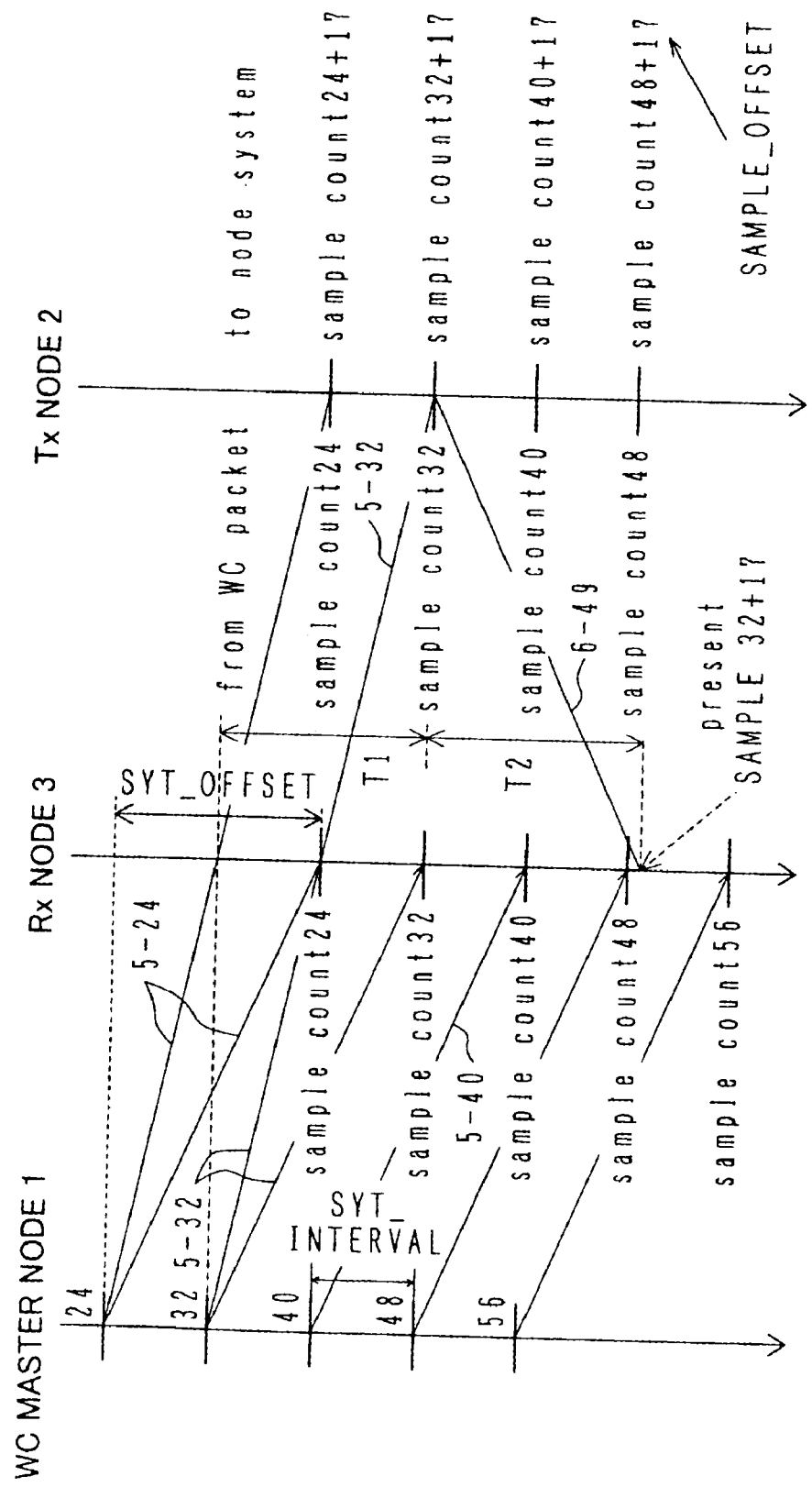

FIG. 3A is a timing chart illustrating the operation to be executed at nodes shown in FIG. 1.

The WC master node 1 sequentially transmits the WC packets 524, 5-32, 5-40 ... indicating the timings of the sample data 24, 32, 40 ... to the Tx node 2 and Rx node 3. The transmission interval of the WC packets 5 is equal to the interval SYT_INTERVAL (refer to FIG. 2).

The longest communication time taken by WC packet 5 to reach the Th node 2 or Rx node 3 from the WC master node 1 is SYT_OFFSET. This time SYT_OFFSET corresponds to the maximum delay time (transfer delay) stipulated by IEEE 1394 standards, and is 352 us. Namely, it is guaranteed that a packet transmitted from one node to another node reaches in 352 us or shorter at the latest.

The maximum delay time SYT_OFFSET is reflected upon the WC packet 5. The WC packet 5-24 includes a sample count 5b or 24-th sample count and a system time WC_SYT 24 which is the system time SYT 24 (FIG. 2) corresponding to the sample count 5b added to the maximum delay time SYT_OFFSET. Namely, the system time WC_SYT 24=SYT 24+SYT_OFFSET. Similarly, the maximum delay time SYT_OFFSET is also reflected upon the WC packets 5-32, 5-40, . . . .

The ordinate of the WC master node 1 shown in FIG. 3 represents the sample count 5b of the WC packet 5 transmitted from the WC master node 1. Each ordinate of the Tx node 2 and Rx node 3 represents the sample count 5b of the WC packet supplied from the WC master node 1. The three nodes 1, 2 and 3 operate on the basis of each sample count ordinate. The sample count ordinate corresponds to a-time axis. Each axis of the three nodes has the same relative time although the absolute time is different. The Tx node 2 and Rx node 3 can establish synchronization on the basis of each sample count axis.

For example, the WC master node 1 transmits the WC packet 5-32 to the Tx node 2 and Rx node 3. The WC packet 5-32 includes the sample count 5b or 32-nd sample count and the system time WC_SYT 32 which is the system time SYT 32 corresponding to the sample count 5b added to the maximum delay time SYT_OFFSET (352 $\mu$s).

Upon reception of the WC packet 5-32, the Tx node 2 transmits a data packet 6-49 to the Rx node 3. This data packet 6-49 has as its top data, the 49-th (32+17) sample data which is an addition of the 32-nd sample count and an offset value SAMPLE_OFFSET (e.g., 17 samples). The data packet 6-49 has DBC 6a of "49" and the sample data 6b from the 49-th to 56-th sample data.

The offset value SAMPLE_OFFSET (e.g., 17 samples) is added by taking into consideration the maximum communication delay time between the Tx node 2 and Rx node 3, and it means that sample data earlier by 17 samples is transmitted. Namely, the transmitted data packet 6-49 has as its top data the sample data having a sample count 5b of "32" of the WC packet 5-32 added to a sample count of "17".

The reason why this maximum communication delay time is set to 17 samples will be described. The maximum communication delay time SYT_OFFSET is 352 $\mu$s as described earlier. The sampling-frequency of audio data is, for example, 48 kHz.

In this case, the number of samples is 48 kHz×352 $\mu$s=16.896. The sample offset value is therefore required to be set to 16.896 samples or larger. The sample offset value is preferably 17 samples, which value is the smallest integer larger than 16.896.

The Rx node 3 receives the data packet 6-49 transmitted from the Tx node 2 at the sample count of "49" at the latest. The total delay time of this communication is T1+T2. The delay time T1 is a communication time of the WC packet 5-32 from the WC master node 1 to Tx node 2, and the delay time T2 is a communication time of the data packet 6-49 from the Tx node 2 to the Rx node 3.

The Rx node 3 loads the received data packet 6-49 in a first-in first-out (FIFO) buffer, and starts a reproducing process of the data packet 6-49 when the sample count takes the value "49". Since the reproducing process stands by and the data packet is loaded in FIFO until the sample count takes the value "49", the delay time T1+T2 can be absorbed.

As described above, the WC packet 5-32 has the system time WC-SYT 32 offset by the maximum delay time SYT_OFFSET which is an offset value to absorb the communication delay time T1.

If the WC packet 5-32 is transmitted without offsetting the system time offset value SYT_OFFSET, the system time corresponding to the sample count "32" already lapsed when the Rx node 3 receives the WC packet 5-32, and data processing is impossible.

The data packet 6-49 includes DBC 6a offset by the sample count offset value SAMPLE_OFFSET which is an offset value to absorb the communication delay time T2.

If the data packet 6-32 is transmitted without offsetting the sample count offset value SAMPLE_OFFSET, the system time corresponding to the sample count "32" already lapsed when the Rx node 3 receives the data packet 6-32, and data processing is impossible.

Figure 4:
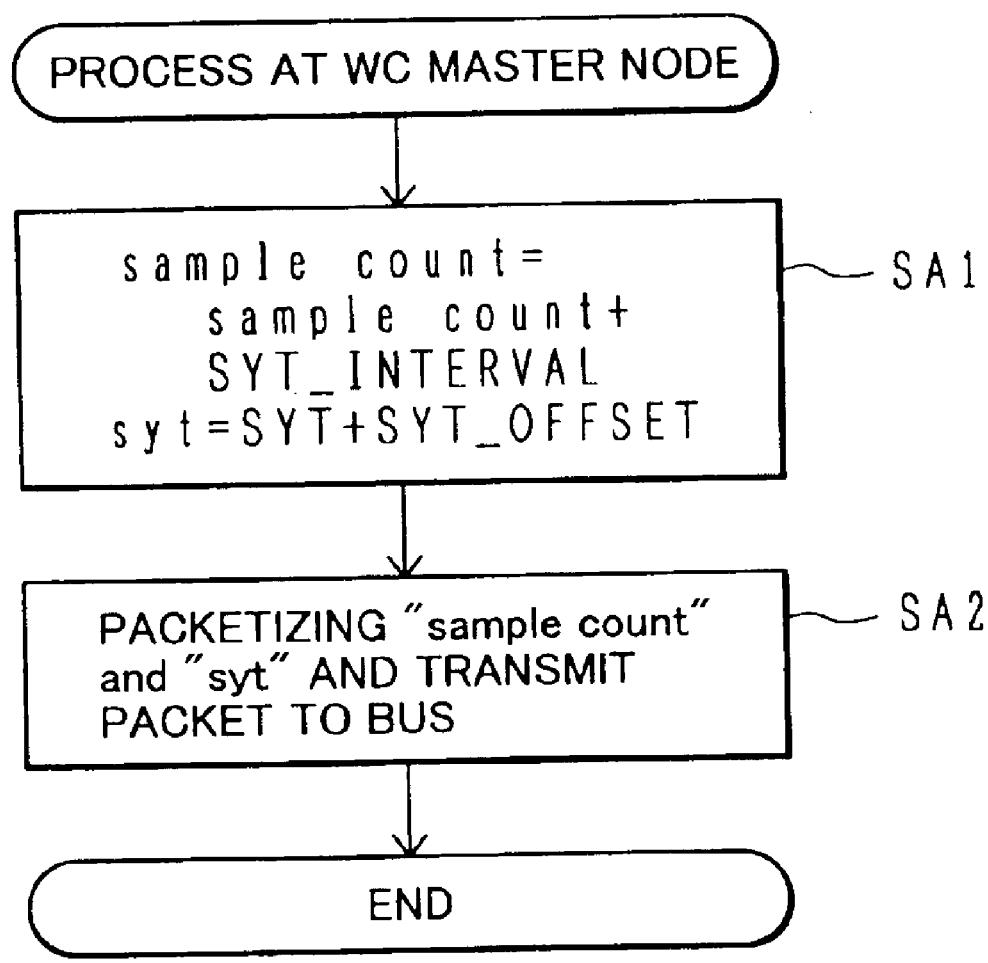
FIG. 4 is a flow chart illustrating a process to be executed at a WC master node.

FIG. 4 is a flow chart illustrating a process to be executed by the WC mater node 1.

At Step SA1, a constant SYT_INTERVAL is added to a register "sample count". The register "sample count" is a register for storing a count of the number of audio data samples. The constant SYT_INTERVAL is the number of samples per one packet, and "8" for example. This register "sample count" corresponds to the sample count 5b in the WC packet 5 shown in FIG. 1.

Next, the system time SYT (FIG. 2) added to the offset value SYT_OFFSET is stored in a register "syt". The system time SYT is, for example, SYT 24 shown in FIG. 2. The offset value SYT_OFFSET is the maximum delay time, e.g., 352 $\mu$s. The offset value SYT-OFFSET added can absorb the delay time shown in FIG. 3A The contents of this register "syt" correspond to the system time 5a in the WC packet 5 shown in FIG. 1.

At Step SA2, the WC packet 5 is generated and transmitted over the bus 4, the WC packet 5 including the sample count 5b represented by the register "sample count" and the system time 5a represented by the register "syt" as shown in FIG. 1.

A process of generating one packet has been described above. The WC master node 1 repeats the above process at a predetermined interval to sequentially transmits the WC packets 5-24, 5-32, 5-40 . . .

The WC packet 5-24 has the system time 5a of WC_SYT 24 (=SYT 24+SYT_OFFSET) and the sample count 5b of "24". The WC packet 5-32 has the system time 5a of WC_SYT 32 (=SYT 32+SYT_OFFSET) and the sample count 5b of "32".

Figure 5:
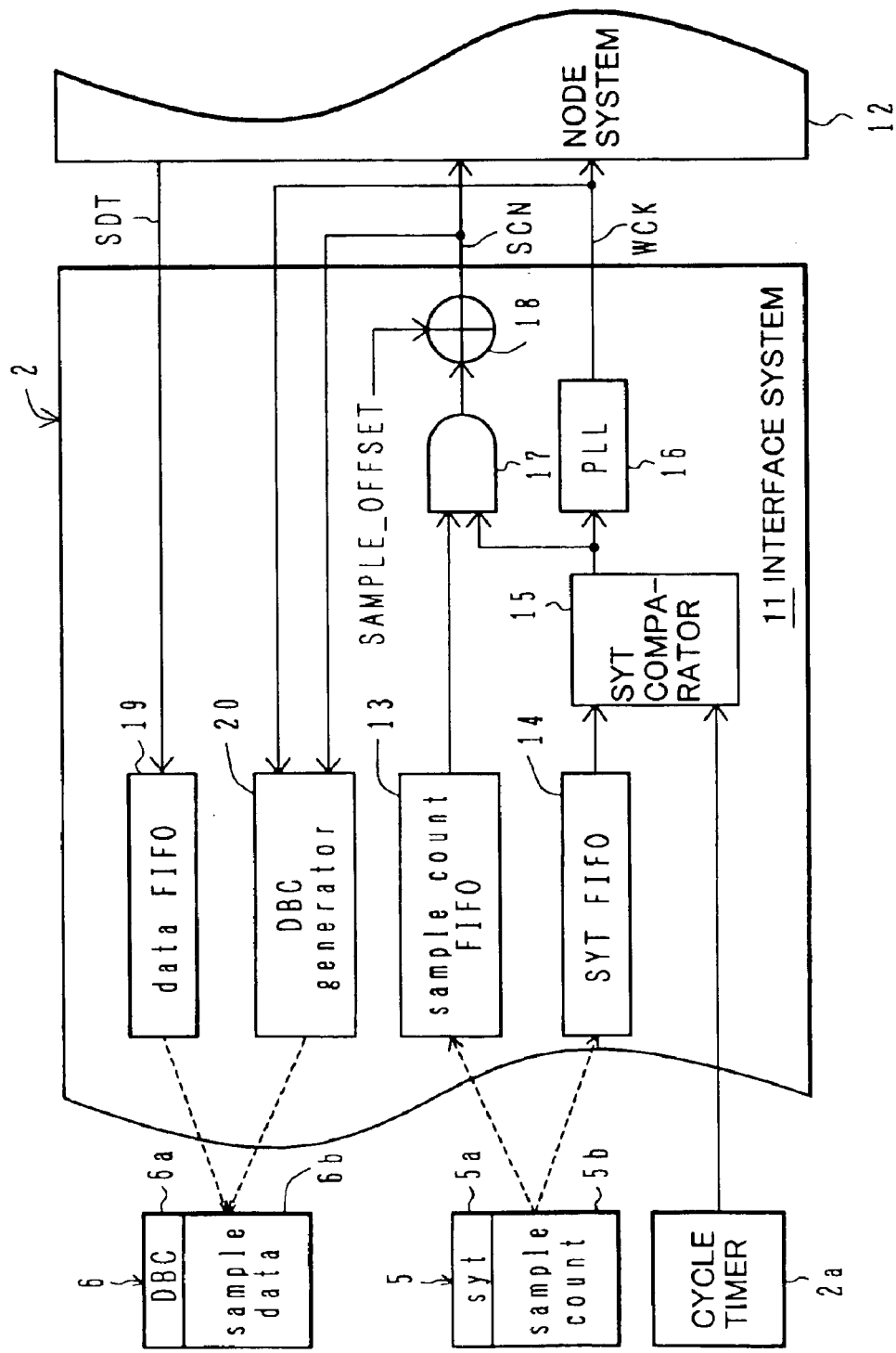
FIG. 5 is a block diagram showing the structure of a first Tx node.

FIG. 5 is a block diagram showing an example of the structure of a first Tx node 1.

The Tx node 2 has an IEEE 1394 interface system 11 and a node system 12.

The WC packet 5 includes the system time 5a and sample count 5b and is supplied from the WC master node 1. A sample count FIFO 13 stores the sample count 5b in a first-in first-out way. A system time FIFO 14 stores the system time 5a in a first-in first-out way.

A system time comparator 15 compares the system time 5a output from FIFO 14 with the lower sixteen bits of the cycle time output from the cycle timer 2a. The cycle time has thirty-two bits. The system time 5a is the maximum delay time SYT_OFFSET (352 $\mu$s) added to the lower sixteen bits of the cycle time of the WC master node 1.

Since the system time 5a is added with the maximum delay time SYT_OFFSET, it has a value larger than the cycle time of the cycle timer 2a. The cycle timer 2a sequentially increments the cycle time at about 25 MHz.

The cycle time eventually becomes coincident with the system time 5a. When they become coincident, the comparator 15 outputs a coincidence signal. Until this coincidence signal is output, a process to be later described stands by, so that the communication delay time T1 (FIG. 3) from the WC master node 1 to Tx node 2 can be absorbed. Even if the WC master node 1 transmits the WC packet 5 to a plurality of Tx nodes 2, a difference of reception time between Tx nodes 2 can be absorbed.

Synchronously with the coincidence signal, a phase locked-loop (PLL) circuit 16 generates word clocks WCK for audio data, for example, at 48 kHz and supplies them to the node system 12.

A timing adjustor 17 outputs the sample count 5b in FIFO 13 to an adder 18 when the coincidence signal is received. The adder 18 adds the offset value SAMPLE_OFFSET (e.g., 17 samples) to the sample count 5b and outputs a sample count SCN. For example, if the sample count 5b is "32", the adder 18 outputs a sample count SCN=32+17=49. The added offset value prepares for absorbing the communication delay time T2 (FIG. 3) from the Tx node 2 to Rx node 3. Absorbing the communication delay time T2 is performed at the Rx node which will be later described with reference to FIG. 7.

Synchronously with the word clock WCK and in response to the sample count SCN (e.g. 49), the node system 12 reads data SDT from eight sets of sample data (e.g., 49-th to 56-th sample data) and stores it in a data FIFO 19 in a first-in first-out way.

A DBC generator 20 generates DBC synchronously with the word clock WCK and in response to a sample count SCN.

DBC 6a is generated by the DBC generator 20. The sample data 6b is generated from the sample data SDT in FIFO 19.

DBC 6a and sample data 6b are packetized to generate a data packet 6. The data packet 6 is transmitted from the Tx node 2 to Rx node 3.

The embodiment is not limited only to the case wherein the value SCN of the sample count 5b added to the offset value SAMPLE_OFFSET by the adder 18 is supplied to the node system, but the sample count 5b itself may be supplied directly. In this case, the node system 12 is required to execute a process which takes the offset value SAMPLE_OFFSET into consideration.

It is also not limited only to the case wherein the node system 12 is supplied with the sample count SCN per each packet, but the sample count may be supplied for each sample.

Figure 6:
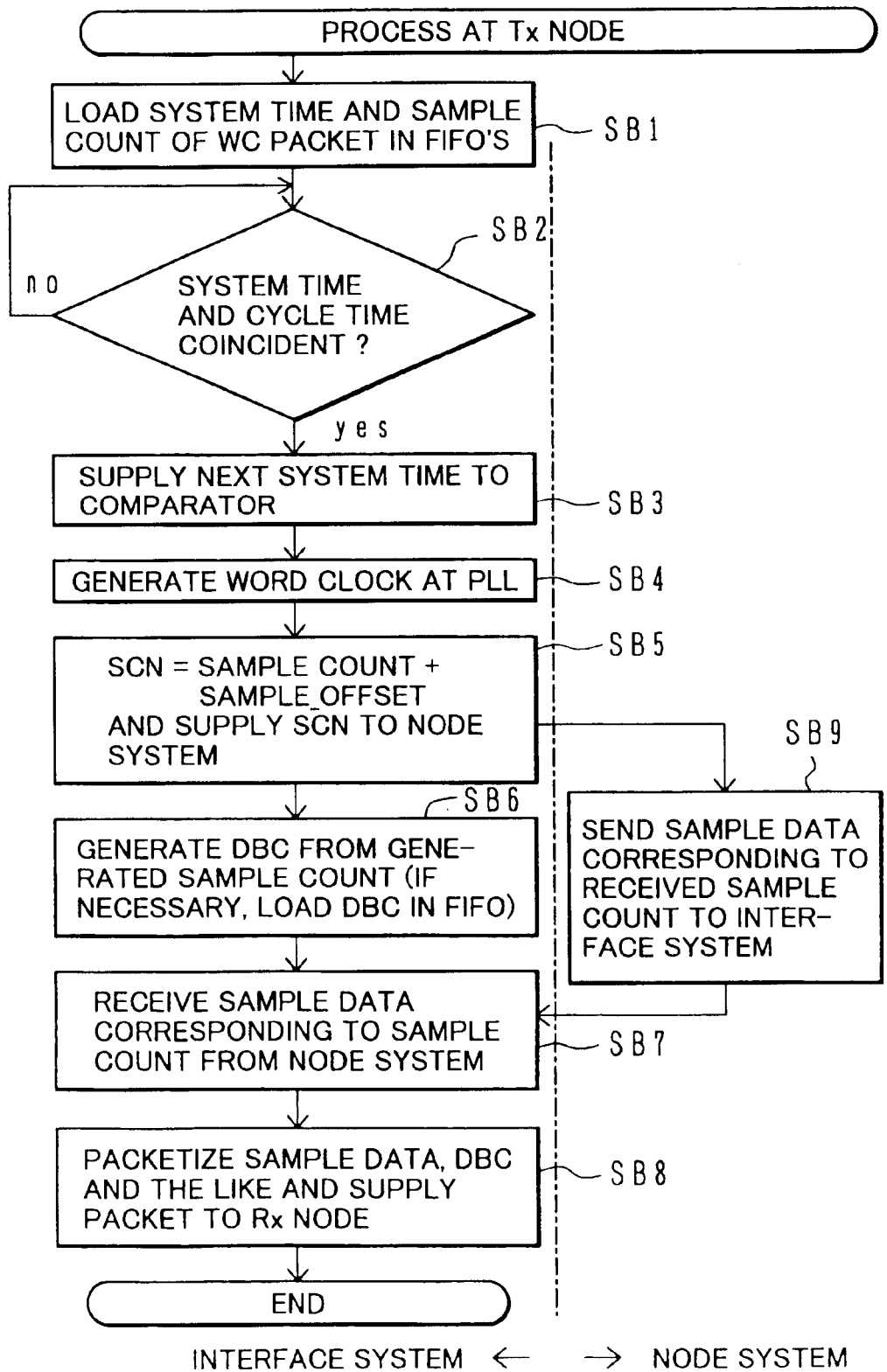
FIG. 6 is a flow chart illustrating a process to be executed at the first Tx node.

FIG. 6 is a flow chart illustrating a process to be executed at the Tx node 2. The process at Steps SB1 to SB8 on the left side of the flow chart is executed by the interface system 11, and the process at Step SB9 on the right side is executed by the node system 12.

At Step SB1, the system time 5a and sample count 5b in the WC packet 5 are loaded in FIFO's 14 and 13.

At Step SB2, the comparator 15 compares the system time with the cycle time and stands by until they become coincident. When they become coincident, the flow advances to Step SB3.

At Step SB3, the next system time loaded in FIFO 14 is supplied to the comparator 15 to prepare for the next comparison.

At Step SB4, PLL 16. generates word docks WCK.

At Step SB5, the adder 18 adds the offset value SAMPLE_OFFSET to the sample count 5b, and outputs the addition value SCN to the node system 12.

Next, the interface system 11 executes Step SB6 and the node system executes Step SB9.

At Step SB6, DBC is generated in accordance with the generated sample count SCN. If necessary, the generated DBC is loaded in FIFO. Next, the flow advances to Step SB7.

At Step SB9, the sample data SDT corresponding to the input sample count SCN is supplied to the interface system 11. Next, the flow advances to Step SB7.

At Step SB7, the interface system 11 receives the sample data SDT from the node system 12.

At Step SB8, the sample data SDT, DBC and the like are packetized to send the data packet 6 to the Rx node 3.

Figure 7:
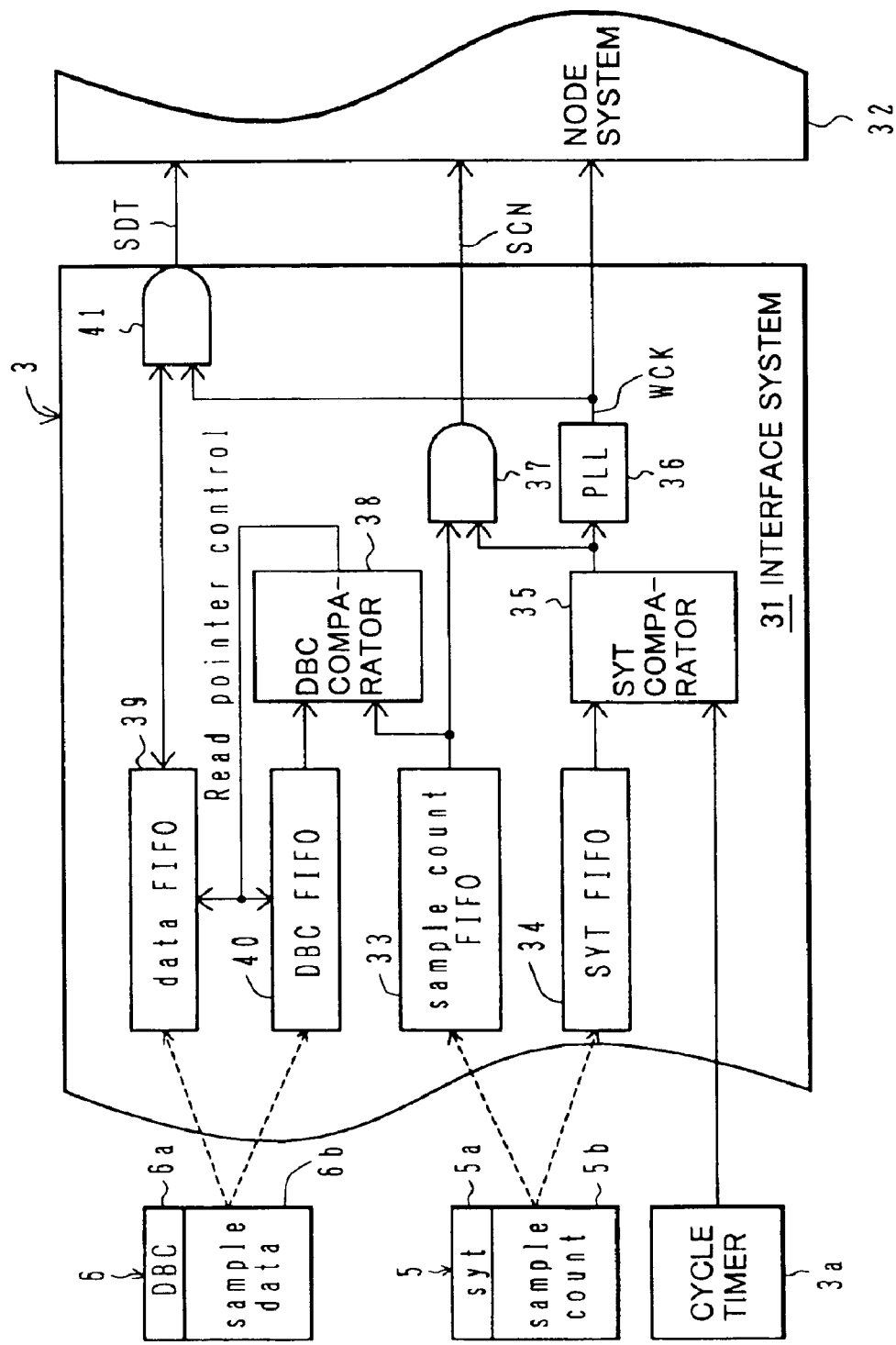
FIG. 7 is a block diagram showing the structure of a first reception node (Rx node).

FIG. 7 is a block diagram showing an example of the structure of the first Rx node 3.

The Rx node 3 has an IEEE 1394 interface system 31 and a node system 32.

The WC packet 5 includes the system time 5a and sample count 5b and is supplied from the WC master node 1. A sample count FIFO 33 stores the sample count 5b in a first-in first-out way. A system time FIFO 34 stores the system time 5a in a first-in first-out way.

A system time comparator 35 compares the system time 5a output from FIFO 34 with the lower sixteen bits of the cycle time output from the cycle timer 3a. The system-time 5a is the maximum delay time SYT_OFFSET (352 µs) added to the lower sixteen bits of the cycle time of the WC master node 1.

When the cycle time becomes coincident with the system time 5a, the comparator 35 outputs a coincidence signal. Until this coincidence signal is output, a process to be later described stands by, so that the communication delay time from the WC master node 1 to Rx node 3 can be absorbed. Even if the WC master node 1 transmits the WC packet 5 to a plurality of Rx nodes 3, a difference of reception time between Rx nodes 3 can be absorbed.

Synchronously with the coincidence signal, a PLL circuit 36 generates word clocks WCK for audio data, for example, at 48 kHz and supplies them to the node system 32.

A timing adjustor 37 outputs the sample count 5b in FIFO 33 to the node system 32, as the sample count SCN.

The data packet 6 includes DBC 6a and sample data 6b and is supplied from the Tx node 2. A DBC FIFO 40 stores DBC 6a in a first-in first-out way. A data FIFO 39 stores the sample data 6b in a first-in first-out way.

A DBC comparator 38 compares the sample count 5b output from FIFO 33 with DBC 6a output from FIFO 40. DBC 6a has a value of the sample count 5b added to the offset value SAMPLE_OFFSET (e.g., 17) by the adder 18 of the Tx node shown in FIG. 5.

Since DBC 6a is added with the offset value, it is larger than the sample count 5b in FIFO 33. FIFO 33 first outputs the input sample count 5b and thereafter outputs the values of the sample count sequentially incremented.

DBC becomes eventually coincident with the sample count. When they become coincident, the comparator 38 outputs a coincidence signal. Until the coincidence signal is output, a process of reading data from the data FIFO 33 stands by, so that the communication delay time T2 (FIG. 3) from the Tx node 2 to Rx node 3 can be absorbed. Even if the Tx node 2 transmits the data packet 6 to a plurality of Rx nodes 3, a difference of reception time between Rx nodes 3 can be absorbed.

In accordance with a comparison result at the comparator 38, the read pointers (addresses) of the data FIFO 39 and DBC FIFO 40 are controlled.

When the coincidence signal is output from the comparator 38, sample data is read from the data FIFO 39 and output to a timing adjustor 41, and the next DBC in the DBC FIFO 40 is set to the comparator 38.

The timing adjustor 41 supplies the data output from FIFO 39 to the node system 32, as the sample data SDT, synchronously with the word clock WCK.

Synchronously with the word clock WCK and in response to the sample count SCN, the node system 32 executes a reproducing process for the sample data (audio data) and produces sounds from a speaker.

The WC packet may use DBC in place of the sample count 5b. In this case, DBC is loaded in FIFO 33, and the comparator 38 compares DBC in FIFO 33 with DBC in FIFO 40.

When the Rx node 3 starts receiving the data packet, it becomes necessary to control the read pointers of the data FIFO 39 and DBC FIFO 40 to have proper values. More specifically, the top DBC value in the DBC FIFO 40 is compared with the top sample count in the sample count FIFO 33 so that each read pointer of the data FIFO 39 and DBC FIFO 40 is controlled on the sample unit basis. In this manner, it is possible to supply the sample count SCN and corresponding sample data SDT to the node system 32 at a proper timing.

According to IEEE 1394 standards, a plurality channel of data can be isochronally transferred. If a plurality channel of data is used, a plurality of read pointer controllers may be provided, or a single read pointer controller may be switched to control each channel. A plurality of data FIFO's 39 are necessary if a plurality channel of data is used.

Figure 8:
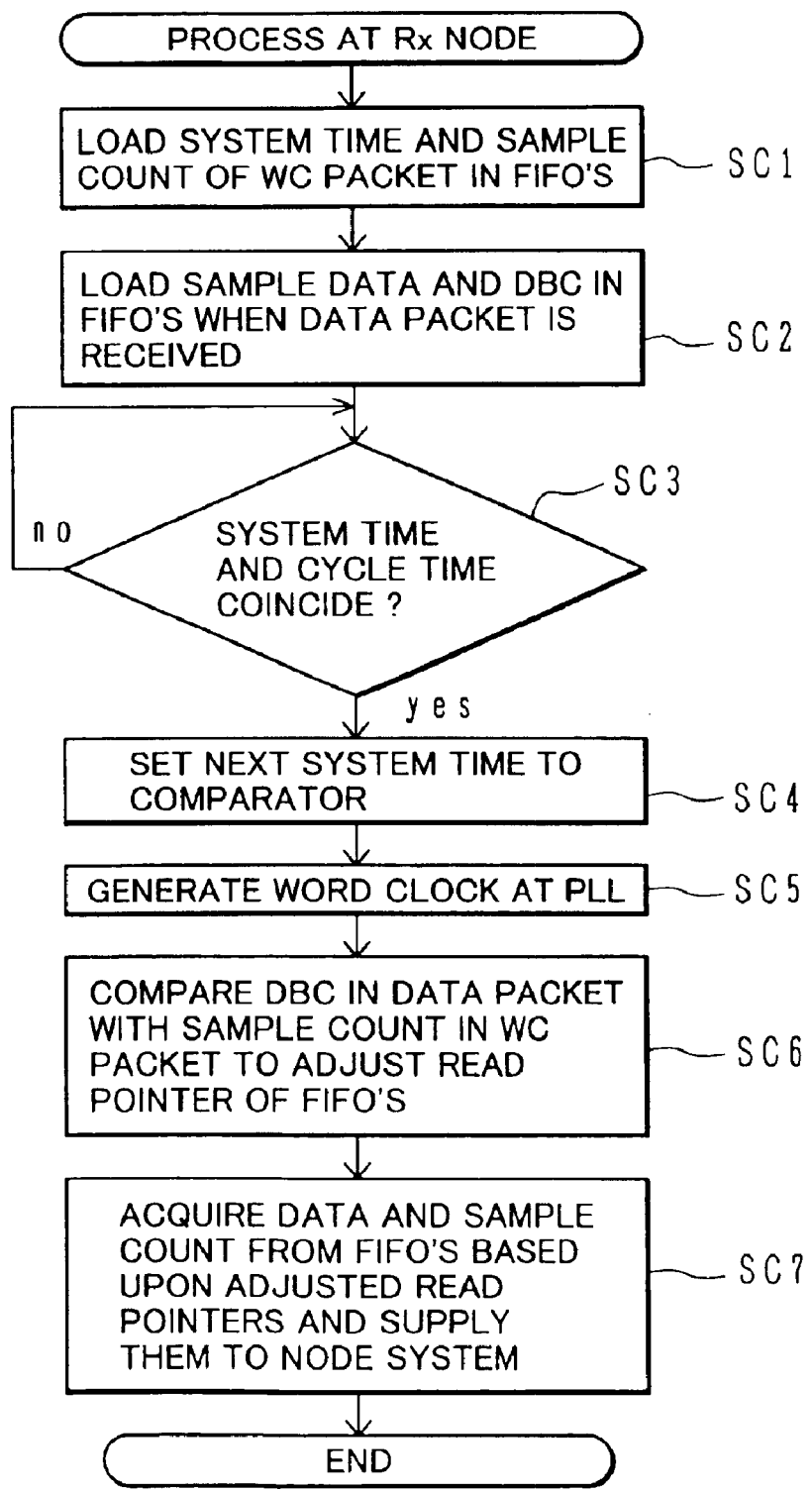
FIG. 8 is a flow chart illustrating a process to be executed at the first Rx node.

FIG. 8 is a flow chart illustrating a process to be executed by the Rx node 3.

At Step SC1, the system time 5a and sample count 5b in the WC packet 5 are loaded in FIFO's 34 and 33.

At Step SC2, when the data packet 6 is received, DBC 6a and sample data 6b in the packet 6 are loaded in FIFO's 40 and 39.

At Step SC3, the comparator 35 compares the system time with the cycle time and stands by until they become coincident. When they become coincident, the flow advances to Step SC4.

At Step SC4, the next system time loaded in FIFO 34 is supplied to the comparator 35 to prepare for the next comparison.

At Step SC5, PLL 36 generates word clocks WCK.

At Step SC6, the comparator 38 compares the sample count in FIFO 33 with DBC in FIFO 40. In accordance with a comparison result, the read pointers of FIFO's 39 and 40 are adjusted.

At Step SC7, in accordance with the adjusted read pointer, the sample data SDT is read from FIFO 39 and supplied to the node system 32. The sample count SCN in FIFO 33 is read and supplied to the node system 32.

In the first embodiment described above, synchronization among nodes is established on the basis of the sample count axis.

Next, with reference to FIG. 3B, the case wherein two first and second transmission nodes 2 transmit the data packet 6 to one reception node 3, will be described. In FIG. 3B, like elements to those shown in FIG. 3A are represented by identical reference numerals.

The WC mater node 1 transmits the WC packet 5 to the first and second transmission nodes 2 and one reception node 3. In accordance with the received WC packet 5, the first and second transmission nodes 2 transmit the data packet 8 to the reception node 3. For example, the first transmission node transmits in real time musical tones played at a first concert hall as audio data, and the second transmission node transmits in real time musical tones played at a second concert hall. The reception node can synchronously reproduce the audio data supplied from the first and second transmission nodes. In this manner, a joint performance at the first and second concert halls can be realized.

Next, the second embodiment will be described. In the second embodiment, synchronization among nodes is established on the system time axis basis instead of the sample count axis basis.

Figure 9:
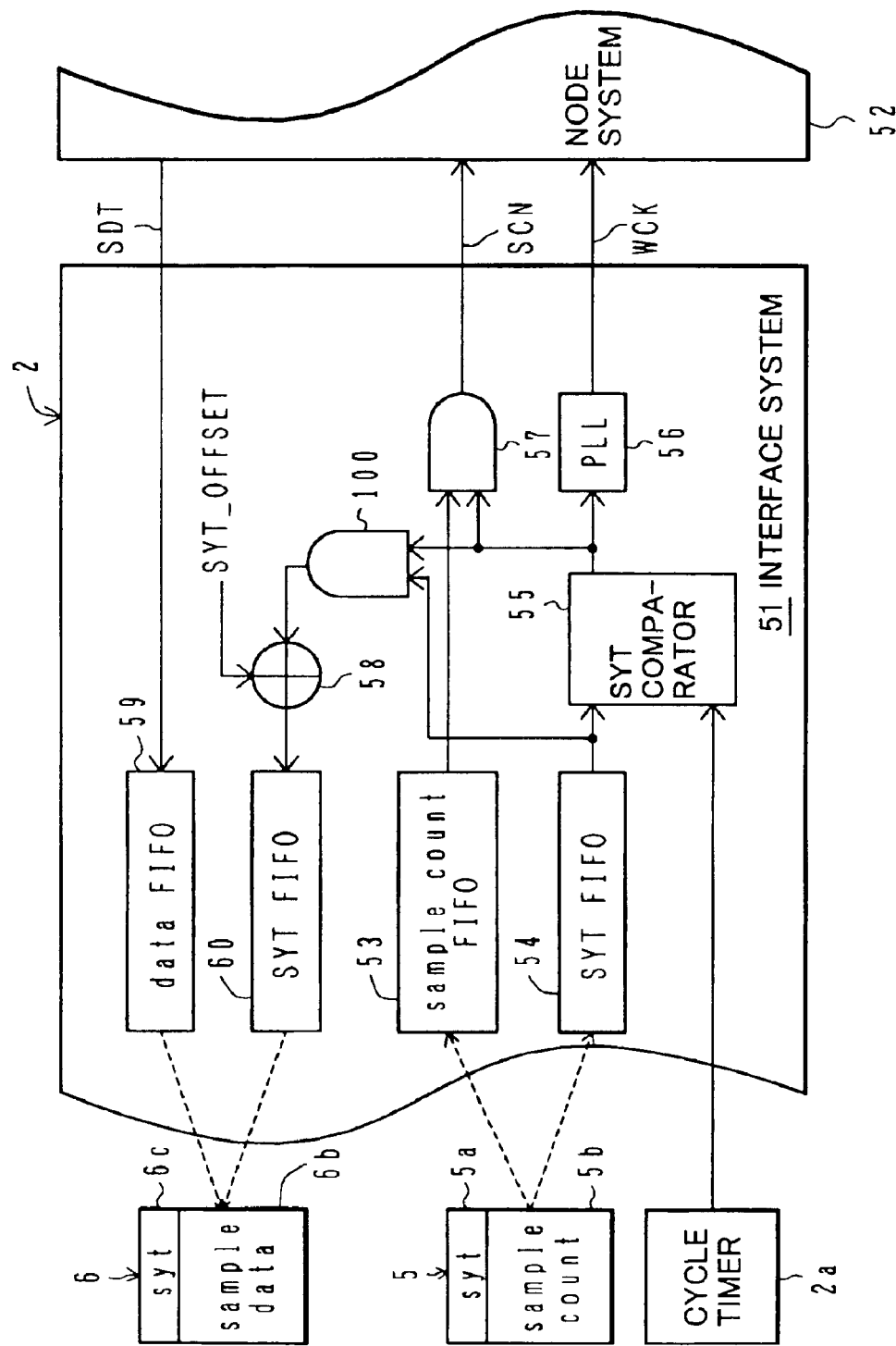
FIG. 9 is a block diagram showing the structure of a second Tx node.

FIG. 9 is a block diagram showing an example of the structure of a second Tx node 2.

In the second embodiment, a system time 6c shown in FIG. 2 is used in place of DBC 6a. The data packet 6 therefore includes the system time 6c and sample data 6b.

The Tx node 2 includes an IEEE 1394 interface system 51 and a node system 52.

The WC packet 5 includes the system time 5a and sample count 5b. A sample count FIFO 53 stores the sample count 5b in a first-in first-out way. A system time FIFO 54 stores the system time 5a in a first-in first-out way.

A system time comparator 55 compares the system time 5a output from FIFO 54 with the lower sixteen bits of the cycle time output from the cycle timer 2a. The system time 5a is the maximum delay time SYT_OFFSET (352 $\mu$s) added to the lower sixteen bits of the cycle time of the WC master node 1.

When the cycle time becomes coincident with the system time 5a, the comparator 55 outputs a coincidence signal. Until this coincidence signal is output, a process to be later described stands by, so that the communication delay time T1 (FIG. 3) from the WC master node 1 to Tx node 2 can be absorbed.

Synchronously with the coincidence signal, a PLL circuit 56 generates word clocks WCK for audio data, for example, at 48 kHz and supplies them to the node system 52.

When the coincidence signal is received, a timing adjustor 57 outputs the sample count 5b in FIFO 53 to the node system 52, as the sample count SCN.

Synchronously with the word clock WCK and in response to the sample count SCN (e.g. 49), the node system 52 reads data SDT from eight sets of sample data (e.g., 49-th to 56-th sample data) and stores it in a data FIFO 59 in a first-in first-out way.

A timing adjustor 100 supplies the system time (coincident with the cycle time detected by the comparator 55) output from the system time FIFO 54 to an adder 58 at the timing of the coincidence signal output from the comparator 55. The adder 58 adds the offset value SYT_OFFSET (e.g., a system time corresponding to 17 samples) to the system time 5a and stores an addition result in a system time FIFO 60 in a first-in first-out way. Adding the offset value prepares for absorbing the communication delay time T2 (FIG. 3) from the Tx node 2 to Rx node 3. Absorbing the communication delay time T2 is performed by the Rx node 3 to be later described with reference to FIG. 11.

A data packet 6 is generated in accordance with the system time 6a in FIFO 60 and the sample data 6b in FIFO 59. The data packet 6 is transmitted from the Tx node 2 to Rx node 3.

Figure 10:
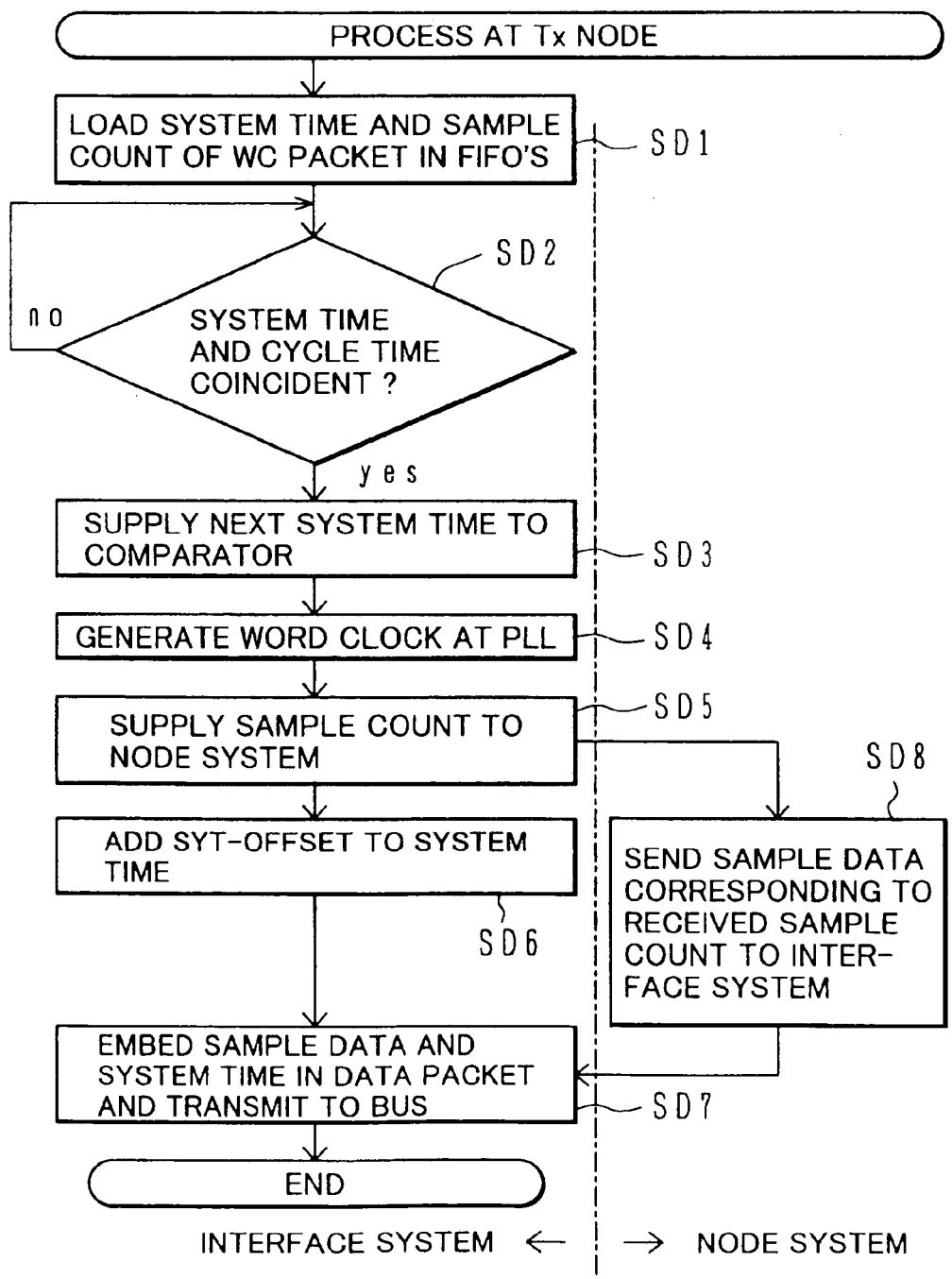
FIG. 10 is a flow chart illustrating a process to be executed at the second Tx node.

FIG. 10 is a flow chart illustrating a process to be executed at the second Tx node 2 (FIG. 9). The process at Steps SD1 to SD7 on the left side of the flow chart is executed by the interface system 51, and the process at Step SB8 on the right side is executed by the node system 52.

At Step SD1, the system time 5a and sample count 5b in the WC packet 5 are loaded in FIFO's 54 and 53.

At Step SD2, the comparator 55 compares the system time with the cycle time and stands by until they become coincident. When they become coincident, the flow advances to Step SD3.

At Step SD3, the next system time loaded in FIFO 54 is supplied to the comparator 55 to prepare for the next comparison.

At Step SD4, PLL 66 generates word clocks WCK.

At Step SD5, the sample count SCN in FIFO 53 is supplied to the node system 52.

Next, the interface system 51 executes Step SD6 and the node system executes Step SD8.

At Step SD6, the adder 58 adds the offset value SYT_OFFSET to the system time 5a coincident with the cycle time and an addition result is loaded in FIFO 60 to thereafter follow Step SD7.

At Step SD8, the sample data SDT corresponding to the supplied sample count SCN is supplied to the interface system 51 to thereafter follow Step SD7.

At Step SD7, the sample data SDT, system time and the like are packetized to transmit a data packet 6 to the Rx node 3 via the bus 4.

Figure 11:
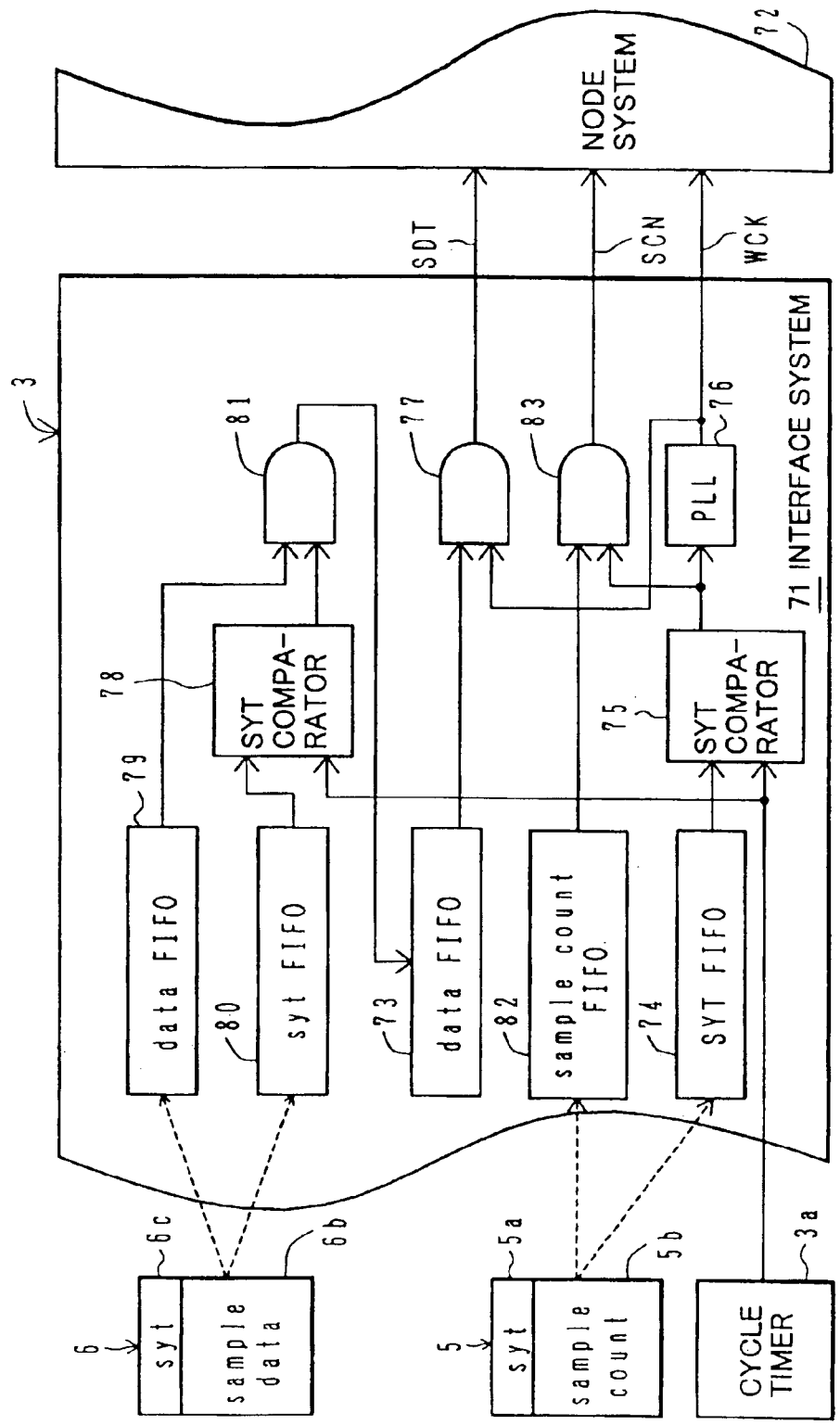
FIG. 11 is a block diagram showing the structure of a second Rx node.

FIG. 11 is a block diagram showing an example of the structure of a second Rx node 3.

As different from the first embodiment (FIG. 7), in the second embodiment, the data packet 6 includes the system time 6c in place of DBC 6a. The data packet 6 therefore includes the system time 6c and sample data 6b.

The Rx node 3 has an IEEE 1394 interface system 71 and a node system 72.

The data packet 6 to be received includes the system time 6c and sample data 6b. A system time FIFO 80 stores the system time 6c in a first-in first-out way. A data FIFO 79 stores the sample data 6b in a first-in first-out way.

A system time comparator 78 compares the system time 6c output from FIFO 80 with the cycle time output from the cycle timer 3a. The system time 6c is the offset value SYT_OFFSET μs) added to the system time 5a by the adder 58 of the Tx node 2 shown in FIG. 9. Since the system time 6c is added with the offset value SYT_OFFSET, it is initially larger than the cycle time of the cycle timer 3a. The cycle timer 3a sequentially increments the cycle time.

When the system time 6c and cycle time become coincident, the comparator 78 outputs a coincidence signal. Until the coincidence signal is output, a process of reading data from the data FIFO 79 stands by, so that the communication delay time T2 (FIG. 3) from the Tx node 2 to Rx node 3 can be absorbed.

Upon reception of the coincidence signal from the comparator 78, the timing adjustor 81 reads the sample data from the data FIFO 79 and stores it in the data FIFO 73.

When the comparator 78 outputs the coincidence signal, the next system time of the system timer 80 is set to the comparator 78.

The WC packet 5 to be received includes a system time 5a and a sample count 5b. The system time FIFO 74 stores the system time 5a in a first-in first-out way. A sample count FIFO 82 stores the sample count 5b in a first-in first-out way.

A system time comparator 75 compares the system time 5a output from FIFO 74 with the lower sixteen bits of the cycle time output from the cycle timer 3a. The system time 5a has a value of the lower sixteen bits of the cycle time at the WC master node 1 added to the maximum delay time SYT_OFFSET (352 μs).

When the cycle time becomes coincident with the system time 5a, the comparator 75 outputs a coincidence signal. Until the coincidence signal is output, the process to be later described stands by, so that the communication delay time from the WC master node 1 to Rx node can be absorbed.

Synchronously with the coincidence signal, a PLL 76 generates word clocks WCK for audio data, for example, at 48 kHz and supplies them to the node system 72.

Synchronously with the word clock WCK, a timing adjuster 77 supplies the sample data 6b in the data FIFO 73 to the node system 72, as the sample data SDT.

When the coincidence signal is received, a timing adjustor 83 supplies the sample count 5b in the sample count FIFO 82 to the node system 72, as the sample count SCN.

Synchronously with the word clock WCK and in response to the sample clock SCN, the node system 72 reproduces the sample data (audio data) SDT to produce sounds from a speaker.

As above, according to the second embodiment, synchronization among nodes can be established on the system time axis basis. The comparator 78 can absorb the communication delay time of the data packet 6 from the Tx node 2 to Rx node 3, whereas the comparator 75 can absorb the communication delay time of the WC packet from the WC master node 1 to Rx node 3. Synchronization among nodes can be established by absorbing these communication delay times.

Figure 12:
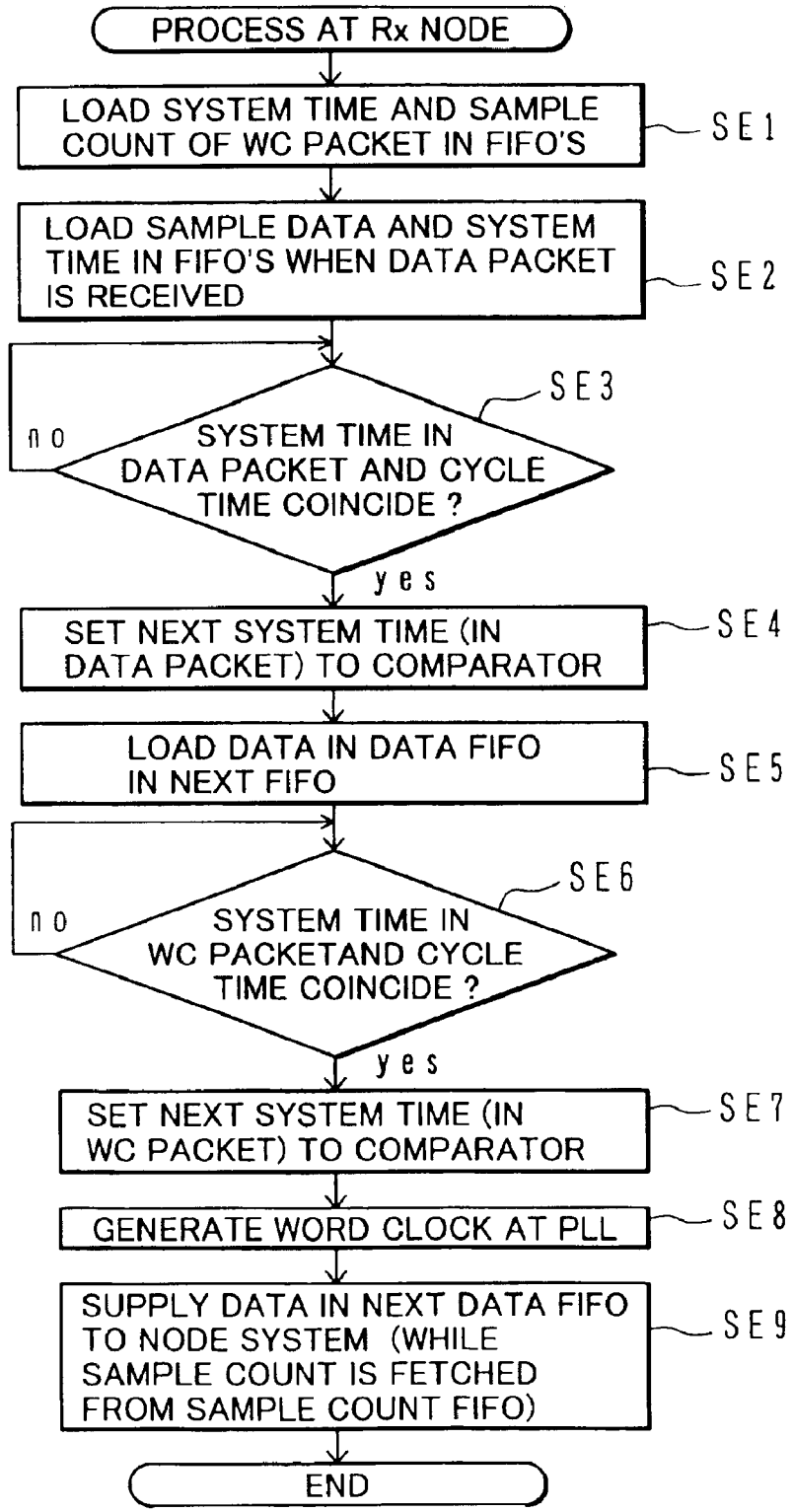
FIG. 12 is a flow chart illustrating a process to be executed at the second Rx node.

FIG. 12 is a flow chart illustrating a process to be executed by the second Rx node 3 (FIG. 11).

At Step SE1, the system time 5a and sample count 5b in the received WC packet 5 are stored in FIFO's 74 and 82.

At Step SE2, when the data packet 6 is received, the system time 6c and sample data 6b in the packet 6 are stored in FIFO's 80 and 79.

At Step SE3, the next system time in FIFO 80 is set to the comparator 78 to prepare for the next comparison.

At Step SE5, the sample data in the data FIFO 79 is stored in the data FIFO 73.

At Step SE6, the comparator 75 compares the system time 5a in FIFO 74 with the cycle time of the cycle timer 3a and stands by until they become coincident. When they become coincident, the flow advances to Step SE7.

At Step SE7, the next system time in FIFO 74 is set to the comparator 75 to prepare for the next comparison.

At Step SE8, PLL 76 generates word clocks WCK.

At Step SE9, the sample count SCN in FIFO 82 and the sample data SDT in FIFO 73 are supplied to the node system.

Next, a method of adjusting the phase of each of the cycle timers 1a, 2a and 3a (FIG. 1) of the WC master node 1, Tx node 2 and Rx node 3, will be described. The WC master node 1, Tx node 2 and Rx node 3 are all connected to the IEEE 1394 bus. Of these nodes, one node is used as a root node. For example, each node is assigned an identification number and the node having the smallest or largest identification number is used as the root node. This configuration thereof will be described below.

Figure 13:
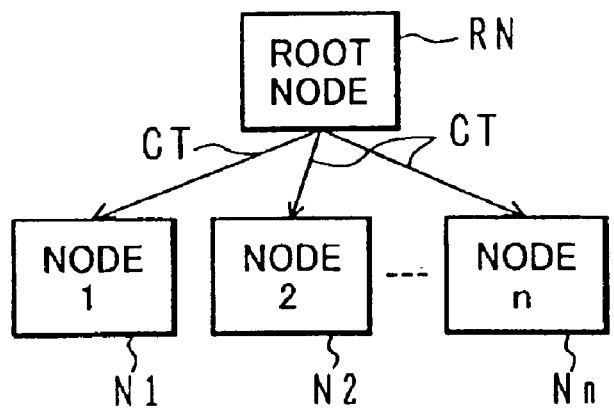
FIG. 13 is a block diagram showing the configuration of a network.

FIG. 13 shows the configuration of the network shown in FIG. 1 expressed from a different viewpoint.

A root node RN is one of the WC master node 1, Tx nodes 2 and Rx nodes 3 shown in FIG. 1. First node N1 to n-th node Nn are nodes which are not the root node.

The root node RN transmits a cycle time CT generated by its own cycle timer over the bus. The nodes N1 to Nn receive the cycle time CT transmitted from the root node RN, and the value of the cycle time CT is set as their cycle time.

Figure 14:
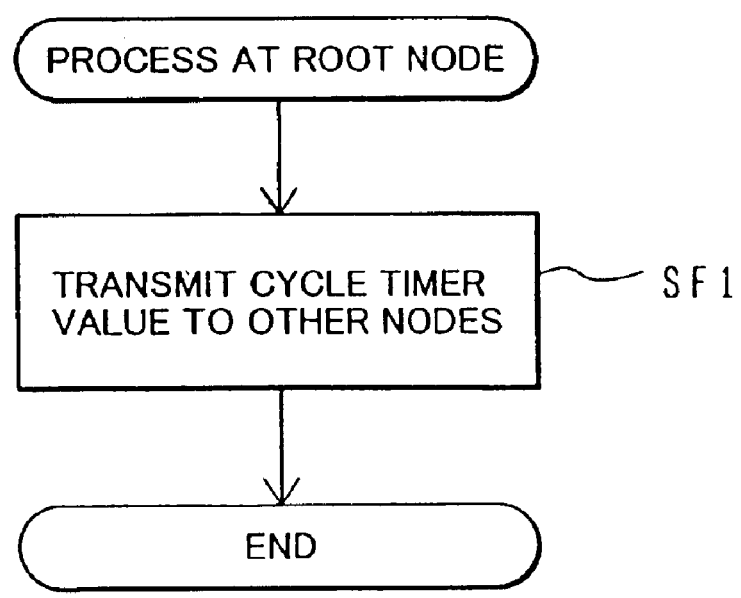
FIG. 14 is a flow chart illustrating a process to be executed at a root node.

FIG. 14 is a flow chart to be executed at the root node RN

At Step SF1, the value CT of the cycle timer of the root node RN is transmitted to other nodes to thereafter terminate the process. The root node RN broadcasts the value CT of its cycle timer to the bus at a predetermined interval.

Figure 15:
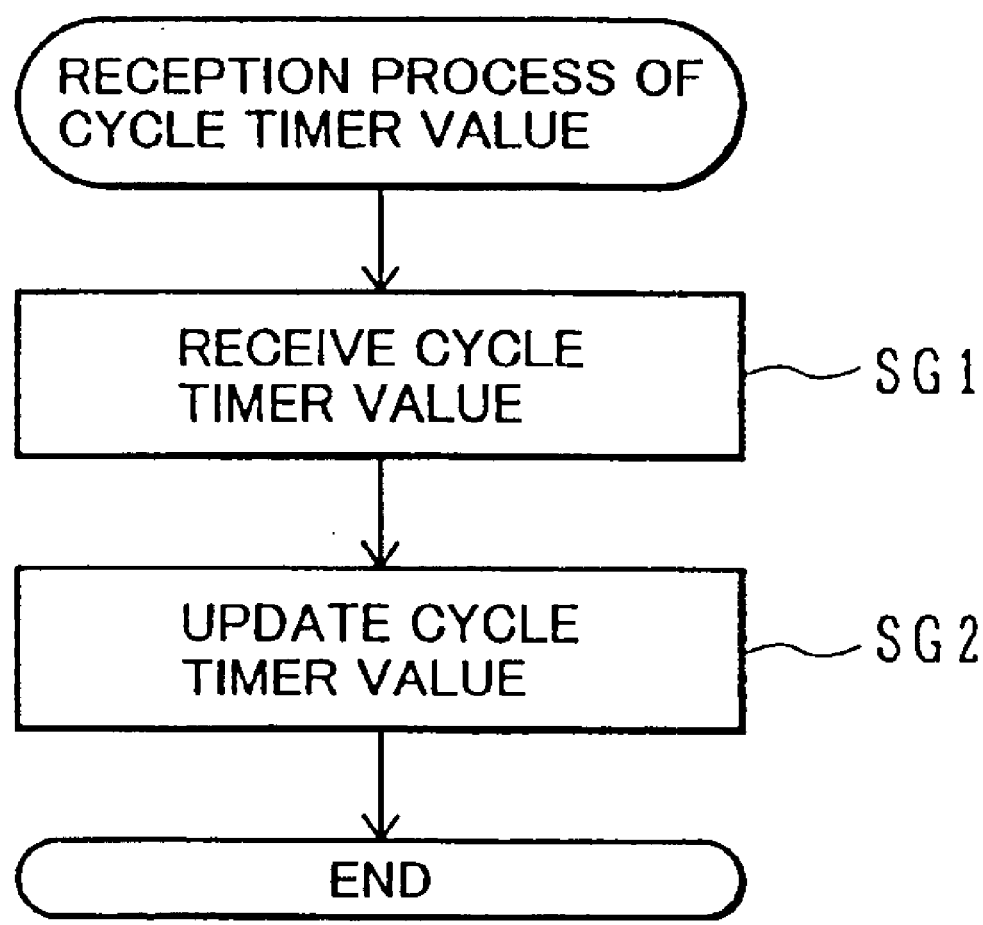
FIG. 15 is a flow chart illustrating a process to be executed at a node different from the root node.

FIG. 15 is a flow chart illustrating a process to be executed by the nodes N1 to Nn.

At Step SG1, the value CT of the cycle timer of the root node RN is received.

At Step SG2, the value of the cycle timer of the node is updated to the received cycle value CT of the cycle timer of the root node RN.

The process illustrated in this flow chart is executed each time the value CT of the cycle timer is supplied from the root node RN.

With the above method, synchronization of cycle timers of respective nodes can be established. Consider now a delay time in transmitting the cycle time CT from the root node RN. The time when each node N1 to Nn receives the cycle time CT changes with the delay time. Next, a process considering the communication delay time will be described.

Each of the nodes N1 to Nn transmits a ping packet to the root node RN. Upon reception of the ping packet, the root node RN returns a response packet. Each of the nodes N1 to Nn measures a time taken to receive the response packet after the ping packet was transmitted. This time is a return communication delay time between the node N1 to Nn and root node RN. Each of the nodes N1 to Nn advances its cycle time by a one-way communication delay time to make the phase of its cycle timer coincide with that of the root node cycle timer.

For example, if the measured return communication delay time is 100 µs, the one-way communication delay time is 50 µs. Each of the nodes N1 to Nn adds its one-way communication delay time (50 µs) to its cycle timer value.

By adding the one-way communication delay time to the cycle timer value, the phase of the cycle timer of each node can be made coincide with that of the root node cycle timer value. A plurality of Rx nodes can therefore produce audio data approximately at the same time. Next, the above-described process will be described with reference to a flow chart.

Figure 16:
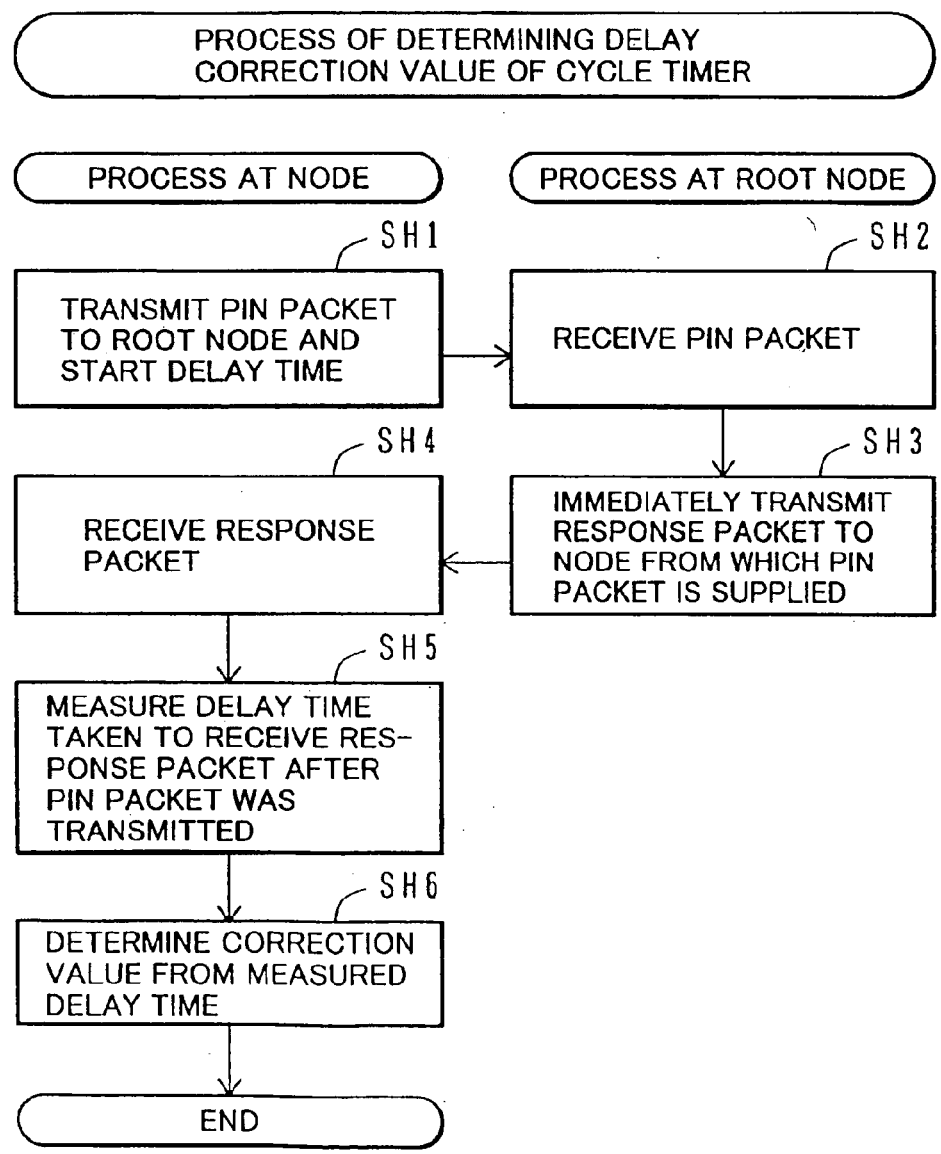
FIG. 16 is a flow chart illustrating a process of determining a delay time correction value for a cycle timer.

This flow chart shown in FIG. 16 illustrates a process of determining a delay time correction value of the cycle timer. The process at Steps SH1, SH4, SH5 and SH6 shown on the left side of the flow chart is executed by the nodes N1 to Nn and the process at Steps SH2 and SH3 on the right side is executed by the root node RN.

At Step SH1, each of the nodes N1 to Nn transmits a ping packet to the root node RN and starts measuring a communication delay time.

At Step SH2, the root node RN receives the ping packet.

At Step SH3, immediately after reception of the ping packet, the root node RN transmits a response packet to each originating node N1 to Nn.

At Step SH4, each of the nodes N1 to Nn receives the response packet.

At Step SH5, each of the nodes N1 to Nn calculates the return communication delay time taken to receive the response packet (Step SH4) after the ping packet was transmitted (Step SH1).

At Step SH6, the one-way communication delay time is calculated which is a half of the return communication delay time. Next, the value of the one-way communication delay time is converted to the cycle time to determine the correction value. The cycle time is a value counted typically at the clock of about 25 MHz.

Figure 17:
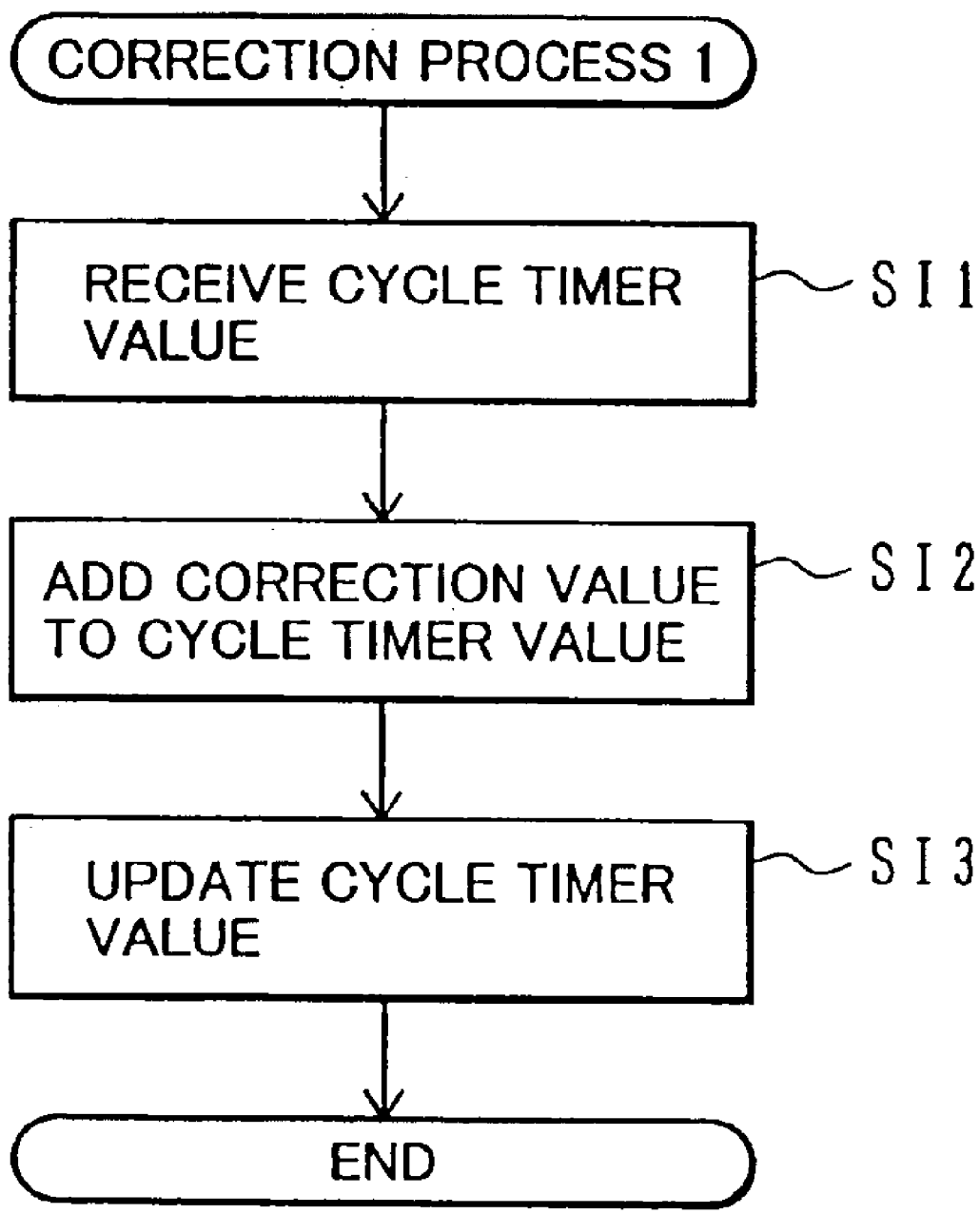
FIG. 17 is a flow chart illustrating a first correction process for a delay time.

FIG. 17 is a flow chart illustrating the correction process to be executed at the node N1 to Nn, which is an alternative of the flow chart shown in FIG. 15.

At step SI1, the value CT of the cycle timer transmitted from the root node RN as illustrated in FIG. 14 is received.

At step SI2, the correction value determined by the process shown in FIG. 16 is added to the received value CT of the cycle timer.

At Step SI3, the value of the cycle timer of the node is updated to the value of the corrected cycle time.

By correcting the cycle time, it is possible to make the phase of the cycle timer of each node coincide with that of the root node cycle timer. For example, the first Tx node 2 (FIG. 5) corrects the value of the cycle timer 2a, and the first Rx node (FIG. 7) corrects the value of the cycle timer 3a.

Next, a method of correcting the system time in place of the cycle time will be described. In the first Tx node 2 (FIG. 5), the comparator 15 compares the value of the cycle timer 2a with the value of the system time FIFO 14. In this case, instead of correcting the value of the cycle timer 2a, the value of the system time FIFO 14 is corrected and set to the comparator 15.

In the first Rx node (FIG. 7), similarly instead of correcting the value of the cycle timer 3a, the value of the system time FIFO 34 is corrected and set to the comparator 35.

In the second Tx node (FIG. 9), similarly instead of correcting the value of the cycle timer 2a, the value of the system time FIFO 54 is corrected and set to the comparator 55.

In the second Rx node (FIG. 11), similarly instead of correcting the value of the cycle timer 3a, the value of the system time FIFO 74 is corrected and set to the comparator 78.

Figure 18:
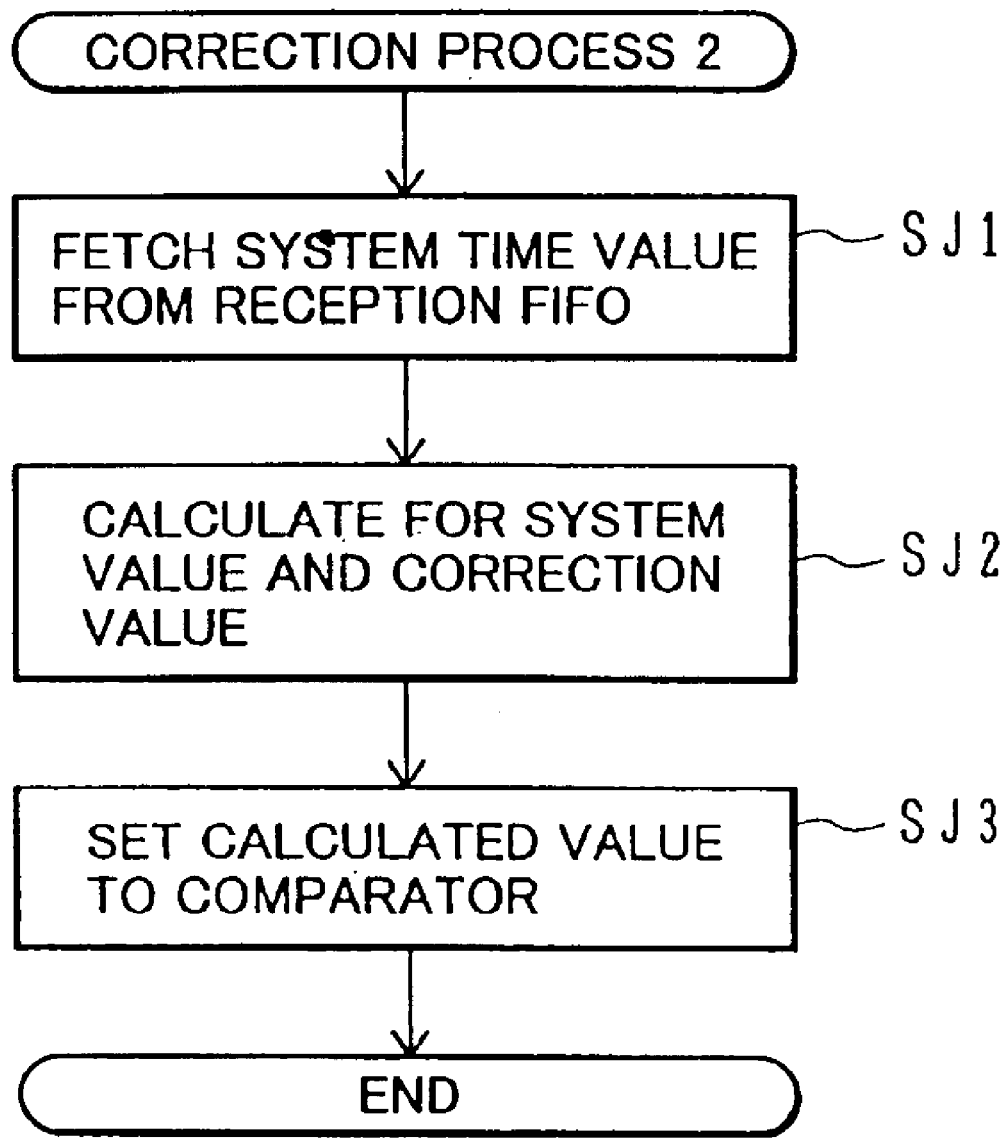
FIG. 18 is a flow chart illustrating a second correction process for a delay time.

FIG. 18 is a flow chart illustrating the correction process for the system time.

At Step SJ1, the values of system times are fetched from the reception FIFO's 14, 34, 54, 74 and 80.

At step SJ2, calculation is made by using the fetched values of the system times and the correction values determined at the process shown in FIG. 16. For example, the correction value is subtracted from the system time value.

At Step SJ3, the calculated values are set to the comparators 15, 35, 55, 75 and 78.

The second Tx node (FIG. 9) may correct the system time in the system time FIFO 60 to transmit the data packet 6. In this case, it is not necessary to correct the value in the system FIFO 80 of the second Rx node (FIG. 11).

As described above, by correcting the cycle time or system time, the phase of the time axis at each node can be made coincident. By making each phase coincident, the phases of transmission timings of a plurality of Tx nodes and reproduction timings of a plurality of Rx nodes can be made coincident.

In the first and second embodiments, the WC master node 1 transmits the WC packet 5 to the Tx node 2 and Rx node 3. The Tx node 2 transmits the data packet 6 to the Rx node 3. The data packet 6 has the sample data 6b as well as DBC 6a and system time 6c.

In the first embodiment, synchronization among nodes can be established on the basis of the sample count axis by using DBC 6a. In the second embodiment, synchronization among nodes can be established on the basis of the system time axis by using the system time 6c.

Since synchronization among nodes can be established, even if the same data is transmitted generally at the same time from one Tx node to a plurality of Rx nodes, the data reproduction timings at these Rx nodes can be adjusted. Each Rx node can reproduce a series of data without any-shift in reproduction timings.

Since synchronization among nodes can be established, even if the same data is transmitted generally at the same time from a plurality of Tx nodes to one Rx node, this Rx node can adjust the timings of the data transmitted from the Tx nodes.

Data in the packet is not limited only to audio data, but it may be video data or the like. Communications are not limited only to IEEE 1394 digital serial communications, but other serial or parallel communications may be used. For example, the Internet, LAN and the like may be used.

Figure 19:
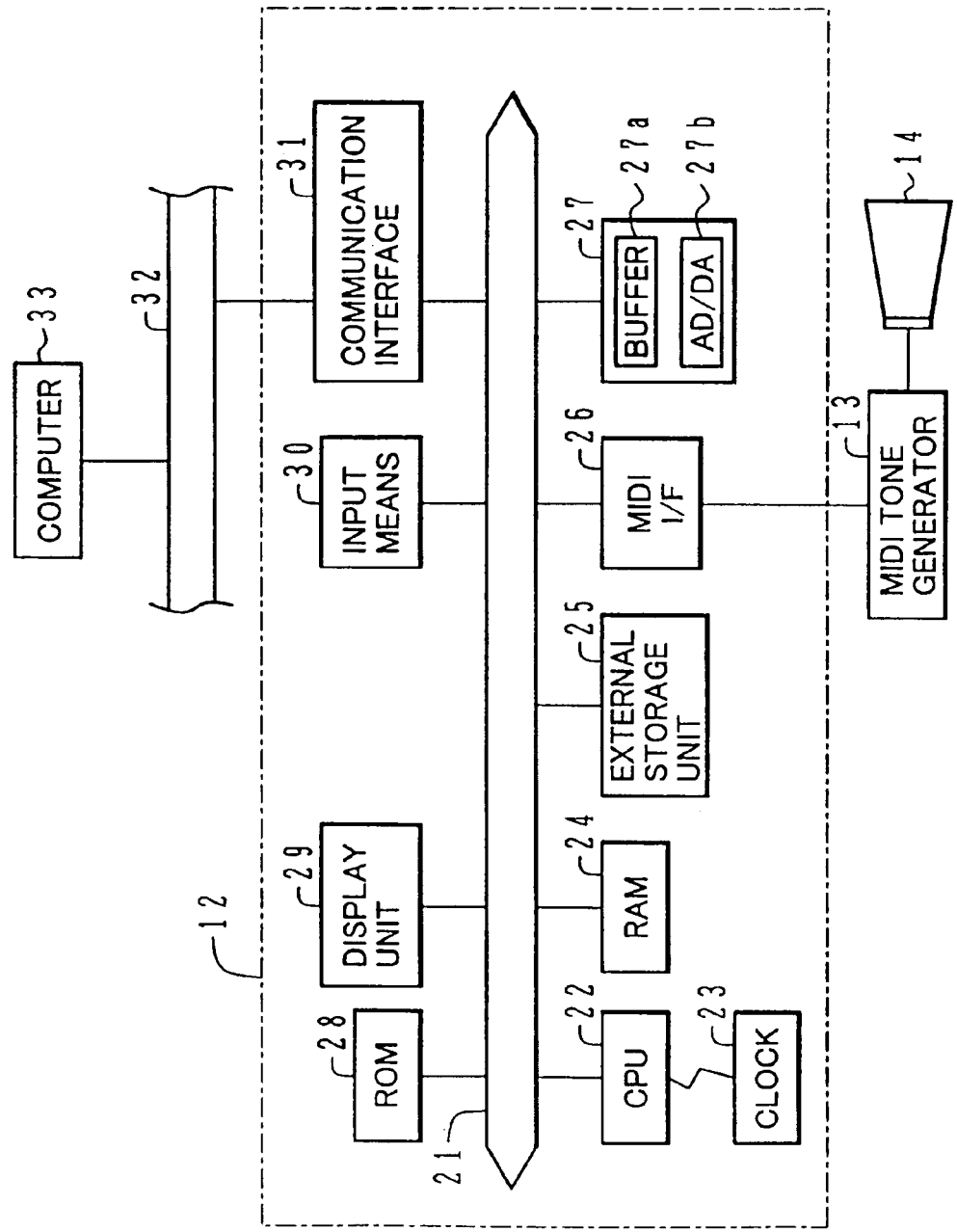
FIG. 19 is a block diagram showing the specific hardware structure of a personal computer.

FIG. 19 is a block diagram showing the specific hardware structure of a personal computer 12.

The structure of the personal computer 12 will be described. Connected to a bus 21 are a CPU 22, a RAM 24, an external storage unit 25, a MIDI interface 25 for transfer MIDI data to and from an external circuit, a sound card 27, a ROM 28, a display unit 29, an input means 30 such as a keyboard, a switch and a mouse, and a communication interface 31 for connection to the Internet.

The sound card 27 has a buffer 27a and a codec circuit 27b. The buffer 27a buffers data to be transferred to and from an external circuit. The codec circuit 27b has an A/D converter and a D/A converter and can convert data between analog and digital data. The codec circuit 27b has also a compression/expansion circuit and can compress/expand data.

The external storage unit 25 may be a hard disk drive, a floppy disk drive, a CD-ROM drive, a magneto-optic disk drive or the like and can store MIDI data, audio data, video data, computer programs or the like.

ROM 28 can store computer programs and various parameters. RAM 24 has a working area for buffers, registers and the like and can store therein the contents copied from the external storage device 25.

CPU 22 executes various operations and processes in accordance with the computer programs stored in ROM 28 or RAM 24. A system clock 23 generates time information. CPU 22 can execute a timer interrupt process in response to the time information supplied from the system clock 23.

The communication interface 31 of the personal computer 12 is connected to the Internet 32. The communication interface 31 is used for transfer MIDI data, audio data, video data, computer programs or the like to and from the Internet.

The MIDI interface 26 is connected to a MIDI tone generator 13, and the sound card 27 is connected to a sound output device 14. CPU 22 receives MIDI data, audio data, video data, computer programs or the like from the Internet 32 via the communication interface 31.

The communication interface 31 may be, in addition to an Internet interface, an Ethernet interface, an IEEE 1394 standard digital communication interface, or an RS-232C interface, and can be connected to various networks.

The personal computer 12 stores computer programs which are used for reception, reproduction and other processes of audio data. If computer programs, various parameters and the like are stored in the external storage unit 25 and read into RAM 24, addition, version-up and the like of computer programs and the like can be easily performed.

A CD-ROM (compact disk read-only memory) drive is a device for reading computer programs and the like stored in a CD-ROM. The read computer programs and the like are stored in a hard disk. In this manner, new installation, version-up and the like of computer programs can be easily performed.

The communication interface 31 is connected to the communication network 32 such as LAN Focal area network), Internet and telephone line, and to a computer 33. If computer programs and the like are not stored in the external storage unit 25, they can be downloaded from the computer 33. In this case, a command for requesting download of computer programs or the like is transmitted to the computer 33 via the communication network 32. Upon reception of this command, the computer 33 distributes the requested computer programs or the like to the personal computer 12 via the communication network 32. The personal computer 12 receives the computer programs or the like via the communication interface 31 and stores them in the external storage unit 25 to complete the download.

The embodiments may be reduced in practice by a commercially available personal computer or the like which is installed with computer programs realizing the functions of the embodiments. In this case, such computer programs or the like may be distributed to users by storing them in a computer readable storage medium such as a CD-ROM and a floppy disk. If such personal computers are connected to the communication network such as LAN, Internet and telephone line, computer programs and various data may be distributed to the personal computers via the communication network.

The present invention has been described in connection with the preferred embodiments. The invention is not limited only to the above embodiments. It is apparent that various modifications, improvements, combinations and the like can be made by those skilled in the art.

What is claimed is:

1. A communication apparatus as one node included in a plurality of nodes connected to a communication network, comprising:

a cycle timer that generates a time value synchronized with a time value received from a root node connected to the communication network;

a sample count generator that generates a count value by counting a sample number for audio data;

a synchronization time value generator that generates a synchronization time value by adding a maximum delay amount to a time value corresponding to the synchronized time value; and a synchronizing packet outputting device that generates a synchronization packet comprising the sample count value and the synchronization time value and outputs the generated synchronization packet to the communication network at a predetermined cycle.

2. A communication apparatus as one node included in a plurality of nodes connected to a communication network, comprising:

a cycle timer that generates a time value synchronized with a time value received from a root node connected to the communication network;

a receiver that receives synchronization information from a word clock node connected to the communication network;

a clock generator that generates a word clock in accordance with the synchronized time value and the received synchronization information;

a sample supplying device that supplies a sample of audio data in a series in accordance with the word clock;

a sample counting device that generates a count value by counting the sample of audio data in accordance with the word clock;

a synchronization count generator that generates a synchronization count value by adding a maximum transfer delay amount to the count value; and a transmitter that generates a data packet comprising a plurality of the supplied samples, the synchronized time value and the synchronization count value and transmits the generated data packet to the communication network.

3. A communication apparatus as one node included in a plurality of nodes connected to a communication network, comprising:

a cycle timer that generates a time value synchronized with a time value received from a root node connected to the communication network;

a receiver that receives synchronization information from a word clock node connected to the communication network;

a clock generator that generates a word clock in accordance with the synchronized time value and the received synchronization information;

a sample supplying device that supplies a sample of audio data in a series in accordance with the word clock;

a sample counting device that generates a count value by counting the sample of audio data in accordance with the word clock;

a synchronization time value generator that generates a synchronization time value by adding a maximum transfer delay amount to the synchronized time value; and a transmitter that generates a data packet comprising a plurality of the supplied samples, the synchronization time value and the count value and transmits the generated data packet to a receiver node connected to the communication network.

4. A communication apparatus as one node included in a plurality of nodes connected to a communication network, comprising:

a cycle timer that generates a time value synchronized with a time value received from a root node connected to the communication network;

a synchronization information receiver that receives synchronization information from a word clock node connected to the communication network;

a clock generator that generates a word clock in accordance with the synchronized time value and the received synchronization information;

a data receiver that receives a data packet comprising a plurality of samples, a time value related to the plurality of samples and a synchronization count value from a transmitter node connected to the communication network; and a sample outputting device that outputs the plurality of samples one by one in accordance with the word clock at a timing that is determined based on the synchronization information and the synchronization count value.

5. A communication apparatus as one node included in a plurality of nodes connected to a communication network, comprising:

a cycle timer that generates a time value synchronized with a time value received from a root node connected to the communication network;

a synchronization information receiver that receives synchronization information from a word clock node connected to the communication network;

a clock generator that generates a word clock in accordance with the synchronized time value and the received synchronization information;

a data receiver that receives a data packet comprising a plurality of samples, a synchronization time value related to the plurality of samples and a count value from a transmitter node connected to the communication network; and a sample outputting device that outputs the plurality of samples one by one in accordance with the word clock at a timing that is determined based on the synchronized time value information and the synchronization time value.

6. A communication apparatus as one node included in a plurality of nodes connected to a communication network, comprising:

a measuring device that measures a communication delay time for a communication between a root node connected to the communication network and the communication apparatus;

a determining device that determines a correction value in accordance with the communication delay time measured by the measuring device;

a time value receiver that receives a time value output from the root node;

a correction device that corrects the received time value in accordance with the correction value;

a cycle timer that generates a time value synchronized with the corrected time value;

a synchronization information receiver that receives synchronization information from a word clock node connected to the communication network; and a clock generator that generates a word clock in accordance with the synchronized time value and the received synchronization information.

7. A communication apparatus as one node included in a plurality of nodes connected to a communication network, comprising:

a cycle timer that generates a time value synchronized with a time value received from a root node connected to the communication network;

a measuring device that measures a communication delay time for a communication between the root node and the communication apparatus;

a determining device that determines a correction value in accordance with the communication delay time measured by the measuring device;

a synchronization information receiver that receives synchronization information from a word clock node connected to the communication network;

a correction device that corrects the received synchronization information in accordance with the correction value; and a clock generator that generates a word clock in accordance with the synchronized time value and the corrected synchronization information.

8. A communication method comprising the steps of:

(a) generating a time value synchronized with a time value received from a root node connected to a communication network;

(b) generating a count value by counting a sample number for audio data;

(c) generating a synchronization time value by adding a maximum delay amount to a time value corresponding to the synchronized time value; and (d) generating a synchronization packet comprising the sample count value and the synchronization time value and outputting the generated synchronization packet to the communication network at a predetermined cycle.

9. A communication method comprising the steps of:

(a) generating a time value synchronized with a time value received from a root node connected to a communication network;

(b) receiving synchronization information from a word clock node connected to the communication network;

(c) generating a word clock in accordance with the synchronized time value and the received synchronization information;

(d) supplying a sample of audio data in a series in accordance with the word clock;

(e) generating a count value by counting the sample of audio data in accordance with the word clock;

(f) generating a synchronization count value by adding a maximum transfer delay amount to the count value; and (g) generating a data packet comprising a plurality of the supplied samples, the synchronized time value and the synchronization count value and transmitting the generated data packet to the communication network.

10. A communication method comprising the steps of:

(a) generating a time value synchronized with a time value received from a root node connected to a communication network;

(b) receiving synchronization information from a word clock node connected to the communication network;

(c) generating a word clock in accordance with the synchronized time value and the received synchronization information;

(d) supplying a sample of audio data in a series in accordance with the word clock;

(e) generating a count value by counting the sample of audio data in accordance with the word clock;

(f) generating a synchronization time value by adding a maximum transfer delay amount to the synchronized time value; and (g) generating a data packet comprising a plurality of the supplied samples, the synchronization time value and the count value and transmitting the generated data packet to a receiver node connected to the communication network.

11. A communication method comprising the steps of:

(a) generating a time value synchronized with a time value received from a root node connected to a communication network;

(b) receiving synchronization information from a word clock node connected to the communication network;

(c) generating a word clock in accordance with the synchronized time value and the received synchronization information;

(d) receiving a data packet comprising a plurality of samples, a time value related to the plurality of samples and a synchronization count value from a transmitter node connected to the communication network; and (e) outputting the plurality of samples one by one in accordance with the word clock at a timing that is determined based on the synchronization information and the synchronization count value.

12. A communication method comprising the steps of:

(a) generating a time value synchronized with a time value received from a root node connected to a communication network;

(b) receiving synchronization information from a word clock node connected to the communication network;

(c) generating a word clock in accordance with the synchronized time value and the received synchronization information;

(d) receiving a data packet comprising a plurality of samples, a synchronization time value related to the plurality of samples and a count value from a transmitter node connected to the communication network; and (e) outputting the plurality of samples one by one in accordance with the word clock at a timing that is determined based on the synchronized time value information and the synchronization time value.

13. A communication method comprising the steps of:

(a) measuring a communication delay time for a communication between a root node connected to a communication network and the communication apparatus;

(b) determining a correction value in accordance with the communication delay time measured by the measuring step (a);

(c) receiving a time value output from the root node;

(d) correcting the received time value in accordance with the correction value;

(e) generating a time value synchronized with the corrected time value;

(f) receiving synchronization information from a word clock node connected to the communication network; and (g) generating a word clock in accordance with the synchronized time value and the received synchronization information.

14. A communication method comprising the steps of:

(a) generating a time value synchronized with a time value received from a root node connected to a communication network;

(b) measuring a communication delay time for a communication between the root node and the communication apparatus;

(c) determining a correction value in accordance with the communication delay time measured by the measuring step (b);

(d) receiving synchronization information from a word clock node connected to the communication network;

(e) correcting the received synchronization information in accordance with the correction value; and (f) generating a word clock in accordance with the synchronized time value and the corrected synchronization information.

15. A storage medium storing a program which a computer executes to realize a communication process, the program comprising the instructions for:

(a) generating a time value synchronized with a time value received from a root node connected to a communication network;

(b) generating a count value by counting a sample number for audio data;

(c) generating a synchronization time value by adding a maximum delay amount to a time value corresponding to the synchronized time value; and (d) generating a synchronization packet comprising the sample count value and the synchronization time value and outputting the generated synchronization packet to the communication network at a predetermined cycle.

16. A storage medium storing a program which a computer executes to realize a communication process, the program comprising the instructions for:
   (a) generating a time value synchronized with a time value received from a root node connected to a communication network;
   (b) receiving synchronization information from a word clock node connected to the communication network;
   (c) generating a word clock in accordance with the synchronized time value and the received synchronization information;
   (d) supplying a sample of audio data in a series in accordance with the word clock;
   (e) generating a count value by counting the sample of audio data in accordance with the word clock;
   (f) generating a synchronization count value by adding a maximum transfer delay amount to the count value; and
   (g) generating a data packet comprising a plurality of the supplied samples, the synchronized time value and the synchronization count value and transmitting the generated data packet to the communication network.

17. A storage medium storing a program which a computer executes to realize a communication process, the program comprising the instructions for:
   (a) generating a time value synchronized with a time value received from a root node connected to a communication network;
   (b) receiving synchronization information from a word clock node connected to the communication network;
   (c) generating a word clock in accordance with the synchronized time value and the received synchronization information;
   (d) supplying a sample of audio data in a series in accordance with the word clock;
   (e) generating a count value by counting the sample of audio data in accordance with the word clock;
   (f) generating a synchronization time value by adding a maximum transfer delay amount to the synchronized time value; and
   (g) generating a data packet comprising a plurality of the supplied samples, the synchronization time value and the count value and transmitting the generated data packet to a receiver node connected to the communication network.

18. A storage medium storing a program which a computer executes to realize a communication process, the program comprising the instructions for:
   (a) generating a time value synchronized with a time value received from a root node connected to a communication network;
   (b) receiving synchronization information from a word clock node connected to the communication network;
   (c) generating a word clock in accordance with the synchronized time value and the received synchronization information;
   (d) receiving a data packet comprising a plurality of samples, a time value related to the plurality of samples and a synchronization count value from a transmitter node connected to the communication network; and
   (e) outputting the plurality of samples one by one in accordance with the word clock at a timing that is determined based on the synchronization information and the synchronization count value.

19. A storage medium storing a program which a computer executes to realize a communication process, the program comprising the instructions for:
   (a) generating a time value synchronized with a time value received from a root node connected to a communication network;
   (b) receiving synchronization information from a word clock node connected to the communication network;
   (c) generating a word clock in accordance with the synchronized time value and the received synchronization information;
   (d) receiving a data packet comprising a plurality of samples; a synchronization time value related to the plurality of samples and a count value from a transmitter node connected to the communication network; and
   (e) outputting the plurality of samples one by one in accordance with the word clock at a timing that is determined based on the synchronized time value information and the synchronization time value.

20. A storage medium storing a program which a computer executes to realize a communication process, the program comprising the instructions for:
   (a) measuring a communication delay time for a communication between a root node connected to a communication network and the communication apparatus;
   (b) determining a correction value in accordance with the communication delay time measured by the measuring instruction (a);
   (c) receiving a time value output from the root node;
   (d) correcting the received time value in accordance with the correction value;
   (e) generating a time value synchronized with the corrected time value;
   (f) receiving synchronization information from a word clock node connected to the communication network; and
   (g) generating a word clock in accordance with the synchronized time value and the received synchronization information.

21. A storage medium storing a program which a computer executes to realize a communication process, the program comprising the instructions for:
   (a) generating a time value synchronized with a time value received from a root node connected to a communication network;
   (b) measuring a communication delay time for a communication between the root node and the communication apparatus;
   (c) determining a correction value in accordance with the communication delay time measured by the measuring instruction (b);
   (d) receiving synchronization information from a word clock node connected to the communication network;
   (e) correcting the received synchronization information in accordance with the correction value; and
   (f) generating a word clock in accordance with the synchronized time value and the corrected synchronization information.

* * * * *